United States Patent
Holz

(10) Patent No.: US 10,761,541 B2
(45) Date of Patent: Sep. 1, 2020

(54) LOCALIZATION WITH NEGATIVE MAPPING

(71) Applicant: X Development LLC, Mountain View, CA (US)

(72) Inventor: Dirk Holz, Mountain View, CA (US)

(73) Assignee: X Development LLC, Mountain View, CA (US)

(*) Notice: Subject to any disclaimer, the term of this patent is extended or adjusted under 35 U.S.C. 154(b) by 431 days.

(21) Appl. No.: 15/494,159

(22) Filed: Apr. 21, 2017

(65) Prior Publication Data

US 2018/0307241 A1  Oct. 25, 2018

(51) Int. Cl.
*G05D 1/02* (2020.01)
*G01C 21/00* (2006.01)
(Continued)

(52) U.S. Cl.
CPC .......... *G05D 1/0274* (2013.01); *B66F 9/063* (2013.01); *B66F 9/0755* (2013.01);
(Continued)

(58) Field of Classification Search
CPC ...... G05D 1/00; G05D 1/0044; G05D 1/0274; G05D 1/02; G05D 1/0212; G05D 1/0229;
(Continued)

(56) References Cited

U.S. PATENT DOCUMENTS

| | | |
|---|---|---|
| 6,516,267 B1 | 2/2003 | Cherveny et al. |
| 2008/0262718 A1* | 10/2008 | Farwell ............... G05D 1/0234 701/445 |

(Continued)

FOREIGN PATENT DOCUMENTS

| | | | |
|---|---|---|---|
| DE | 102008058828 | * | 5/2009 |
| EP | 2336801 | * | 6/2011 |
| EP | 2336801 A2 | | 6/2011 |

OTHER PUBLICATIONS

Fassbender et al., "Landmark=based navigation in large-scale outdoor environment", 2015 IEEE/RSJ International Conference on Intelligent Robots and Systems (IROS), Dec. 17, 2015.*

(Continued)

*Primary Examiner* — Catherine T. Rastovski
(74) *Attorney, Agent, or Firm* — McDonnell Boehnen Hulbert & Berghoff LLP

(57) ABSTRACT

Example embodiments include determining a map of an environment of a robotic vehicle. The map includes locations of a plurality of mapped landmarks within the environment and a false detection source region within the environment. The embodiments further include detecting a plurality of candidate landmarks, and determining which of the detected candidate landmarks correspond to one of the plurality of mapped landmarks and which correspond to false detections. The embodiments additionally include estimating a pose of the robotic vehicle within the environment. The embodiments further include determining which of the detected candidate landmarks determined to correspond to false detections fall within the false detection source region. The embodiments still further include determining a confidence level of the pose estimate based on which of the detected candidate landmarks determined to correspond to false detections fall within the false detection source region.

19 Claims, 18 Drawing Sheets

(51) Int. Cl.

| | | |
|---|---|---|
| *G01S 17/89* | (2020.01) | |
| *G01C 21/16* | (2006.01) | |
| *G01C 21/20* | (2006.01) | |
| *G01S 7/48* | (2006.01) | |
| *G01S 17/42* | (2006.01) | |
| *B66F 9/075* | (2006.01) | |
| *G01S 7/00* | (2006.01) | |
| *B66F 9/06* | (2006.01) | |
| *G01S 17/86* | (2020.01) | |

(52) U.S. Cl.
CPC ......... *G01C 21/005* (2013.01); *G01C 21/165* (2013.01); *G01C 21/206* (2013.01); *G01S 7/003* (2013.01); *G01S 7/4808* (2013.01); *G01S 17/42* (2013.01); *G01S 17/86* (2020.01); *G01S 17/89* (2013.01); *G05D 1/0244* (2013.01); *G05D 2201/0216* (2013.01); *Y10S 901/01* (2013.01)

(58) Field of Classification Search
CPC .. G05D 1/0234; G05D 1/0238; G05D 1/0244; G05D 1/0248; G05D 1/0247; G05D 1/0289; G01C 21/00; G01C 21/005; G01C 21/165; G01C 21/206; G01S 17/86; G01S 17/42; G01S 17/89; G01S 7/003; G01S 7/4808; B66F 9/063; B66F 9/0755

See application file for complete search history.

(56) References Cited

U.S. PATENT DOCUMENTS

| | | | |
|---|---|---|---|
| 2010/0256908 A1 | 10/2010 | Shimshoni et al. | |
| 2011/0150348 A1 | 6/2011 | Anderson | |
| 2012/0323431 A1* | 12/2012 | Wong | G01C 21/206 701/25 |
| 2015/0031390 A1* | 1/2015 | Robertson | G01C 21/165 455/456.1 |
| 2015/0228077 A1 | 8/2015 | Menashe et al. | |
| 2016/0062359 A1 | 3/2016 | Liao et al. | |
| 2017/0031369 A1* | 2/2017 | Liu | G06K 9/0063 |

OTHER PUBLICATIONS

Alves et al., "Localization and navigation of a mobile robot in an office-like environment", 2013 13th International Conference on Autonomous Robot Systems, Oct. 10, 2013.*

Emogy, "Landmark manipulation system for mobile robot navigation", The 2010 International Conference on Computer Engineering & Systems, Dec. 23, 2010.*

* cited by examiner

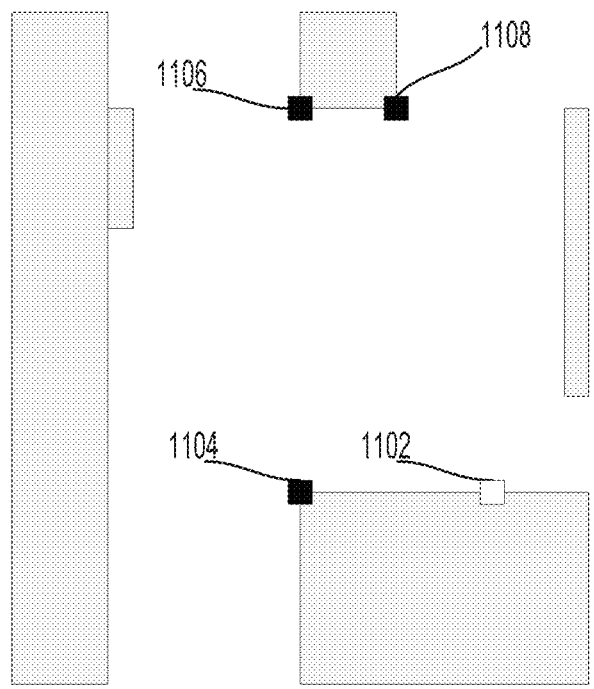
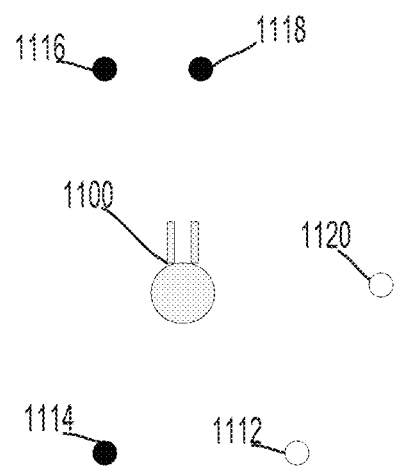
FIG. 11A
FIG. 11B
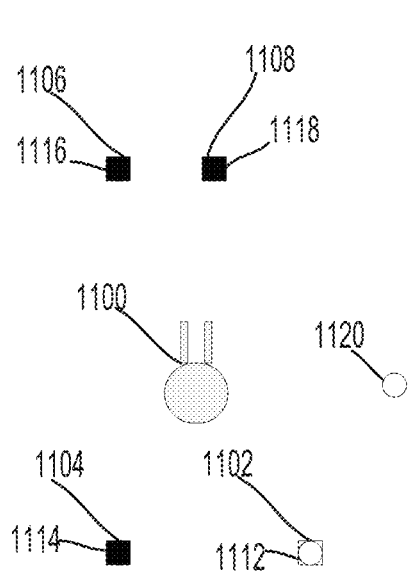
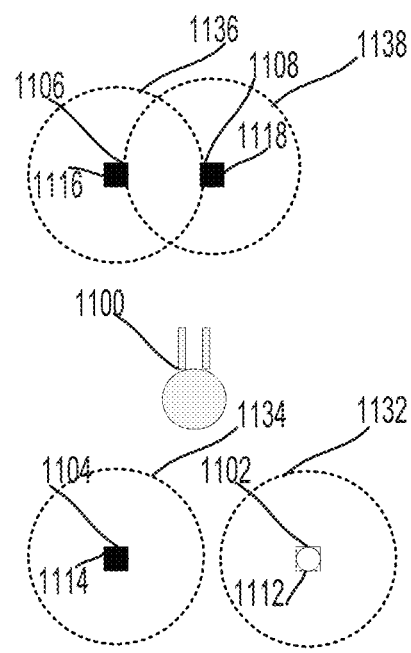
FIG. 11C
FIG. 11D

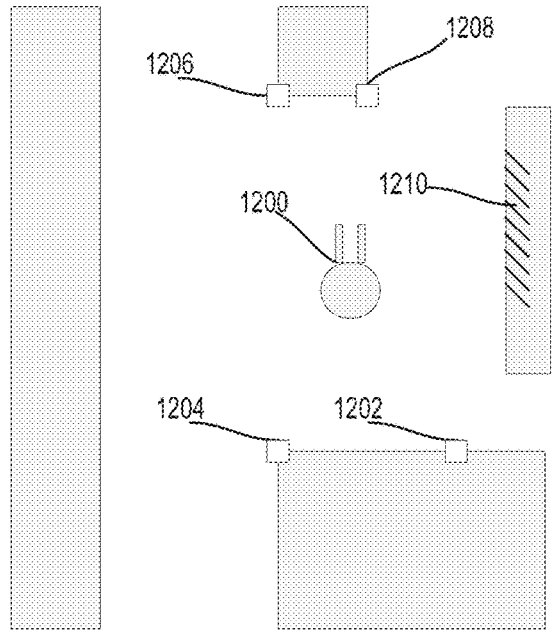
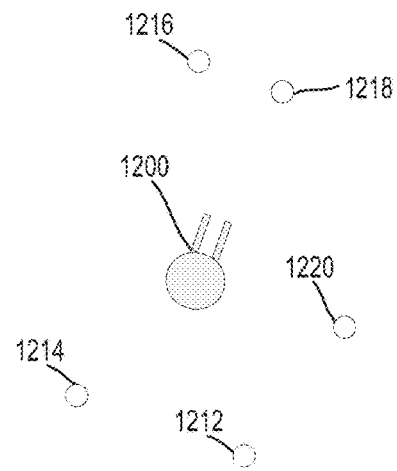
FIG. 12A  FIG. 12B
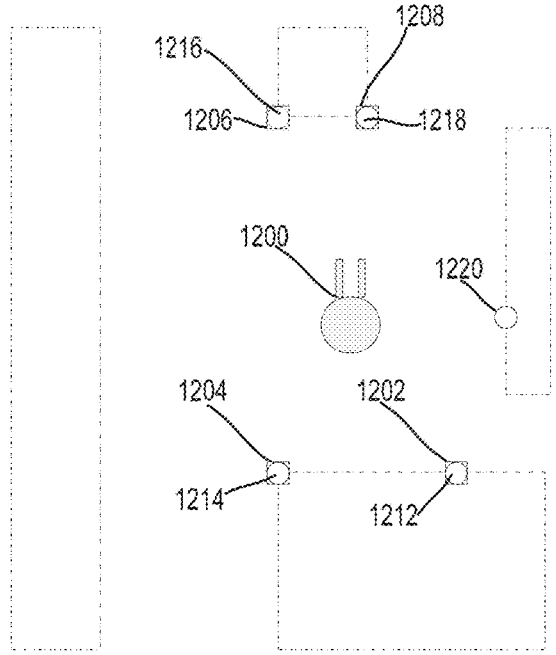
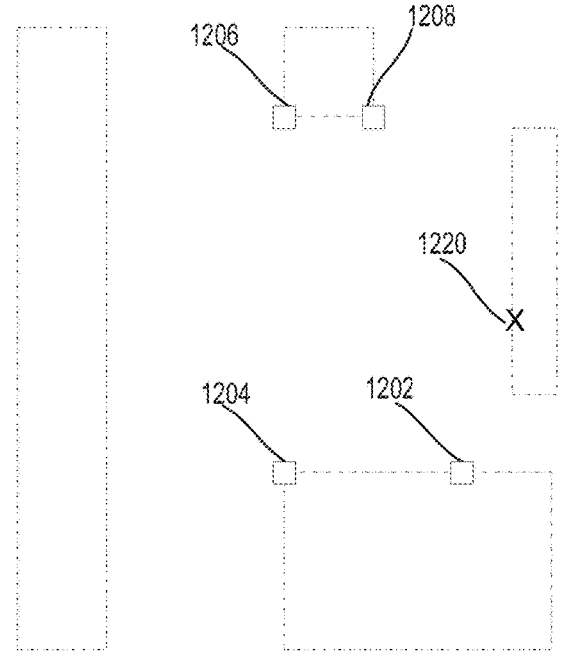
FIG. 12C  FIG. 12D

LOCALIZATION WITH NEGATIVE MAPPING

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

Example systems and methods may help to localize a robotic vehicle within an environment of the robotic vehicle, and thereby assist the robotic vehicle in navigating through the environment. An environment of the robot may include landmarks. The locations of the landmarks may be mapped. The robotic vehicle may detect the landmarks, and the robotic vehicle, or a processor external to the robotic vehicle, may associate the detected landmarks with those on the map, and thereby estimate a pose of the robotic vehicle within the environment. However, the robotic vehicle may also falsely detect landmarks within the environment. Such falsely detected landmarks may negatively affect the pose estimate. As such, each detected landmark may be treated as a candidate landmark until each landmark is determined to correspond to a landmark or to a false detection. Where such false detections can be identified, they can be used to assist in localizing the robotic vehicle. One or more sources of the false detections may be mapped. The pose of the robotic vehicle may be estimated based on the detected landmarks. Based on the estimated pose, the false detections may be associated with mapped sources of false detections. So associated, the false detections may assist in determine a confidence level of the pose estimate. For example, if one or more of the false detections cannot be associated with a false detection source, the pose estimate may be less likely to be accurate, and the confidence level of the pose estimate may be lower. The robotic vehicle may be navigated through the environment based in part on the pose estimate and the confidence level associated with the pose estimate.

In one example, a method is provided that includes determining a map of an environment. The map includes locations of a plurality of mapped landmarks within the environment and a false detection source region within the environment. The method further includes detecting a plurality of candidate landmarks based on sensor data from a sensor. The method also includes determining which of the plurality of candidate landmarks correspond to one of the plurality of mapped landmarks and which correspond to false detections. The method additionally includes estimating a pose of the robotic vehicle within the environment based on the plurality of candidate landmarks determined to correspond to one of the plurality of mapped landmarks. The method further includes determining, based on the estimated pose of the robotic vehicle, which of the plurality of candidate landmarks determined to correspond to false detections fall within the false detection source region. The method still further includes determining a confidence level of the pose estimate based on which of the plurality of candidate landmarks determined to correspond to false detections fall within the false detection source region.

In another example, a system is provided that includes a robotic vehicle, a sensor mounted on the robotic vehicle, one or more processors, and a non-transitory computer readable medium. The system further includes program instructions stored on the non-transitory computer readable medium and executable by the one or more processors to determine a map of an environment of the robotic vehicle. The map includes locations of a plurality of mapped landmarks within the environment and a false detection source region within the environment. The program instructions further detect a plurality of candidate landmarks based on sensor data from the sensor mounted the robotic vehicle. The program instructions also determine which of the plurality of candidate landmarks correspond to one of the plurality of mapped landmarks and which correspond to false detections. The program instructions additionally estimate a pose of the robotic vehicle within the environment based on the plurality of candidate landmarks determined to correspond to one of the plurality of mapped landmarks. The program instructions further determine, based on the estimated pose of the robotic vehicle, which of the plurality of candidate landmarks determined to correspond to false detections fall within the false detection source region. The program instructions still further determine a confidence level of the pose estimate based on which of the plurality of candidate landmarks determined to correspond to false detections fall within the false detection source region.

In another example, a non-transitory computer readable medium is provided having stored therein instructions executable by one or more processors to cause a computing system to perform functions. The functions include determining a map of an environment. The map includes locations of a plurality of mapped landmarks within the environment and a plurality of false detection source regions within the environment. The functions further include detecting a plurality of candidate landmarks based on sensor data from a sensor mounted on the robotic vehicle. The functions also include determining which of the plurality of candidate landmarks correspond to one of the plurality of mapped landmarks and which correspond to false detections. The functions additionally include estimating a pose of the robotic vehicle within the environment based on the plurality of candidate landmarks determined to correspond to one of the plurality of mapped landmarks. The functions further include determining, based on the estimated pose of the robotic vehicle, which of the plurality of candidate landmarks determined to correspond to false detections fall within one of the false detection source regions. The functions still further include determining a confidence level of the pose estimate based on which of the plurality of candidate landmarks determined to correspond to false detections fall within one of the false detection source regions.

In another example, a system is provided that includes means for determining a map of an environment. The map includes locations of a plurality of mapped landmarks within the environment and a false detection source region within the environment. The system further includes means for detecting a plurality of candidate landmarks based on sensor data from a sensor mounted on a robotic vehicle. The system also includes means for determining which of the plurality of candidate landmarks correspond to one of the plurality of mapped landmarks and which correspond to false detections. The system additionally includes means for estimating a pose of the robotic vehicle within the environment based on the plurality of candidate landmarks determined to correspond to one of the plurality of mapped landmarks. The system further includes means for determining, based on the estimated pose of the robotic vehicle, which of the plurality of candidate landmarks determined to correspond to false detections fall within the false detection source region. The system still further includes means for determining a confidence level of the pose estimate based on which of the plurality of candidate landmarks determined to correspond to false detections fall within the false detection source region.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 11A, 11B, 11C, and 11D illustrate determination of inliers associated with another sample set of candidate landmarks and corresponding mapped landmarks, in accordance with an example embodiment.

FIG. 12A illustrates an environment of a robotic vehicle, in accordance with an example embodiment.

FIG. 12B illustrates a plurality of detected candidate landmarks within an environment of a robotic vehicle, in accordance with an example embodiment.

FIG. 12C illustrates an association between the detected candidate landmarks and mapped landmarks on a map of an environment of a robotic vehicle, in accordance with an example embodiment.

FIG. 12D illustrates an updated map of an environment of a robotic vehicle that includes an indication of a false detection, in accordance with an example embodiment.

DETAILED DESCRIPTION

Figure 1:
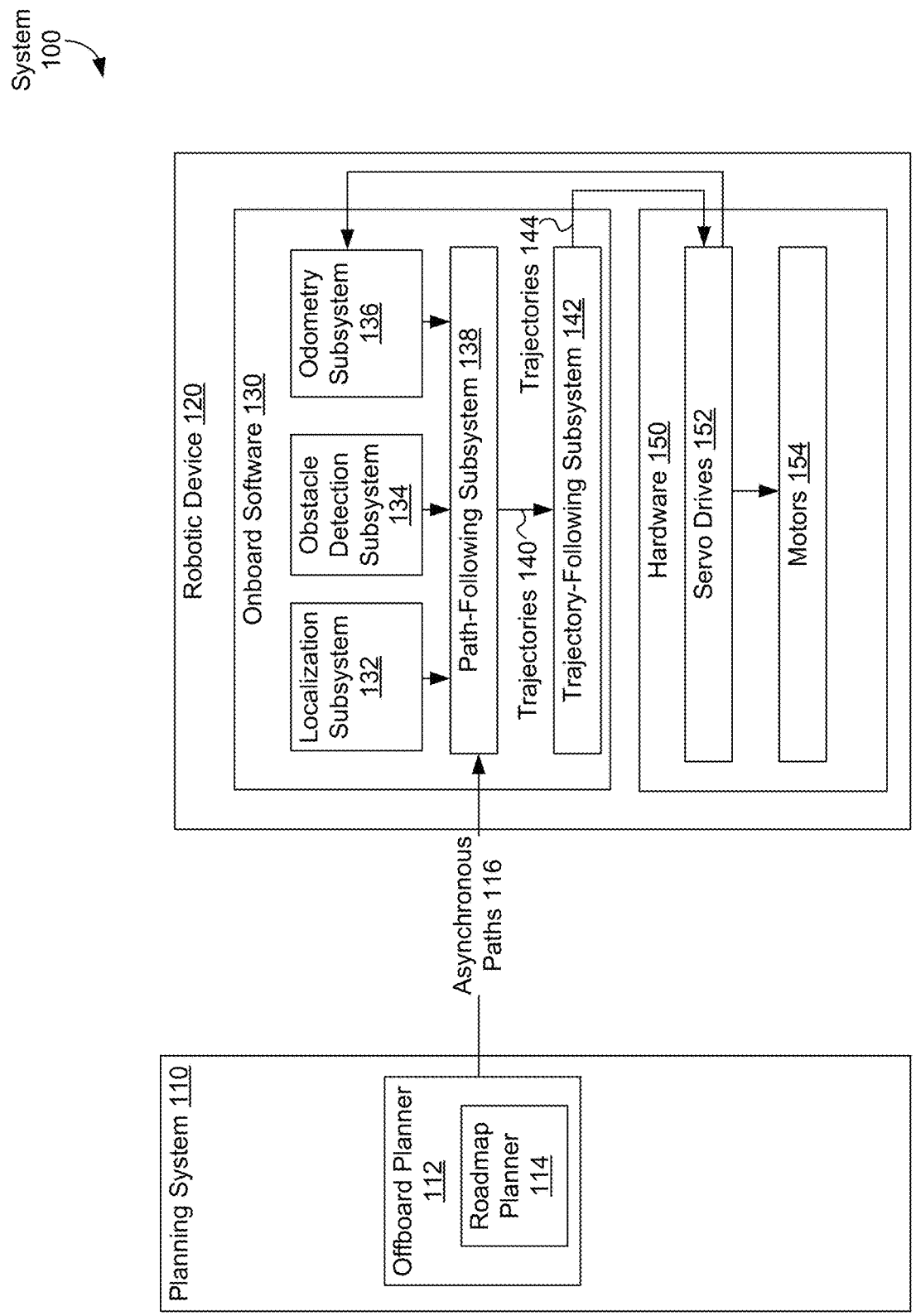
FIG. 1 is a block diagram of a system, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments may include or otherwise relate to methods and systems that may be used to estimate a pose of a vehicle, such as a robotic vehicle or a manually-operated vehicle, within an environment of the robotic vehicle and to thereby assist the robot in navigating through the environment. For example, one or more sensors on the robotic vehicle may detect landmarks by receiving signals from candidate landmarks within the environment. The robotic vehicle may determine its location in relation to the candidate landmarks based on the received signals. The robotic vehicle may determine which of the candidate landmarks correspond to mapped landmarks and which correspond to false detections. The robotic vehicle may estimate its pose within the environment by transforming its location in relation to the detected landmarks into its location in relation to the corresponding mapped landmarks. The robotic vehicle may also determine a pose estimation confidence based on the detected candidate landmarks. Though, in some scenarios, false detections may detract from an accurate pose estimate, example methods and systems described herein may use these false detections to assist in determining a confidence level of the pose estimate.

In some examples, the robot may receive or detect signals that are not associated with a landmark, or that misrepresent the location of a landmark. This type of received or detected signal may be referred to as a "false detection." False detections may cause the robot to inaccurately estimate its pose within the environment, and thus hinder the robot from navigating effectively through the environment. For example, the robot may erroneously associate certain mapped landmarks with the detected landmarks because the detected landmarks include one or more false detections. Based on this erroneous association, the robot may incorrectly estimate its pose within the environment and may navigate through the environment ineffectively.

By leveraging a previously mapped false detection source region, example systems and methods may use false detections to assist the robotic vehicle in navigating through the environment, rather than impeding such navigation. To this end, detected landmarks may be treated as candidate landmarks, the candidate landmarks may be vetted to determine which of them correspond to mapped landmarks, and which correspond to false detections. A map that indicates false detection source regions may then be used to determine which of the false detections are expected and which are unexpected.

Some examples may include sampling multiple subsets of the candidate landmarks (e.g., subsets of three candidate landmarks). Each sampled candidate landmark of a subset may then be paired with a corresponding mapped landmark. This process may help to vet the candidate landmarks because some sampled subsets will include false detections and others will not. Each sampled subset may be evaluated individually. These examples may further include determining a transformation to apply to the candidate landmarks of each subset. The transformation may align the sampled candidate landmarks of each subset with the corresponding mapped landmarks so that there is a minimal distance between the sampled candidate landmarks and the corresponding mapped landmarks. Using a subset of the candidate landmarks and corresponding mapped landmarks may decrease the computation required to determine the transformation.

Some examples may further include determining a number of inliers associated with each sampled subset. The transformation determined for each sampled subset may be applied to all of the candidate landmarks. The number of inliers for a sampled subset may be based upon distances between the transformed candidate landmarks and neighboring mapped landmarks. For example, the distances between the transformed candidate landmarks and neighboring mapped landmarks (e.g., closest mapped landmarks) may be compared to an inlier threshold distance. Transformed candidate landmarks with distances to neighboring mapped landmarks that are less than or equal to the inlier threshold distance may be referred to as "inliers." Transformed candidate landmarks with distances to neighboring mapped landmarks that are greater than the threshold value may be referred to as "outliers." An inlier may indicate that the transformed subset accurately aligned the associate candidate landmark with a neighboring mapped landmark, while an outlier may indicate the opposite. A sampled subset that includes no false detections is more likely to produce a transform that accurately aligns the candidate landmarks with neighboring mapped landmarks, and will in turn produce more inliers. Thus, determining the number of inliers may help to vet the candidate landmarks because a greater number of inliers may correspond to a sampled subset with few or no false detections, while a greater number of outliers may correspond to a subset that includes one or more false detections.

In some examples, indications of locations of false detection sources may be mapped as well. Such sources of false detections may occupy relatively large portions of the map. For instance, a false detection source may include a reflective surface within the environment, such as a wall. As such, entire regions of the environment containing false detections may be mapped. Such regions may be ill-suited for use while estimating a pose of a robotic vehicle, because, a false detection may come from any portion of that region. However, candidate landmarks corresponding to mapped landmarks can be used to estimate the pose of the robotic vehicle. Based on the pose, it may be determined whether the detected candidate landmarks that correspond to false detections fall within a mapped false detection source region. Where such landmarks do fall within a false detection source region, it may be determined that the pose estimate is more likely to be accurate. Conversely, false detections that do not fall within a mapped false detection source region may indicate that the pose estimate is less likely to be accurate.

Mapping the indications of false detection source locations, such as false detection source regions may include navigating one or more robots through the environment. A robot may identify false detections, determine a pose estimate, and, based on the pose estimate, map the false detection source locations. Where several false detection source locations are proximate to one another, a false detection source region may be determined.

In some examples, the confidence level of the pose estimate may be based on both the number of inliers associated with a sample set, and the number of candidate landmarks determined to correspond to false detections that fall within a previously mapped false detection source region within the environment. For example, the confidence may be based on a ratio of candidate landmarks that correspond to a mapped landmark or that fall within a false detection source region to the total number of candidate landmarks. A ratio that is close to one may indicate that there are very few unexpected false detections, while a ratio that is close to zero may indicate that there are many unexpected false detections.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. SYSTEM DESIGN FOR ROBOTIC DEVICES

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
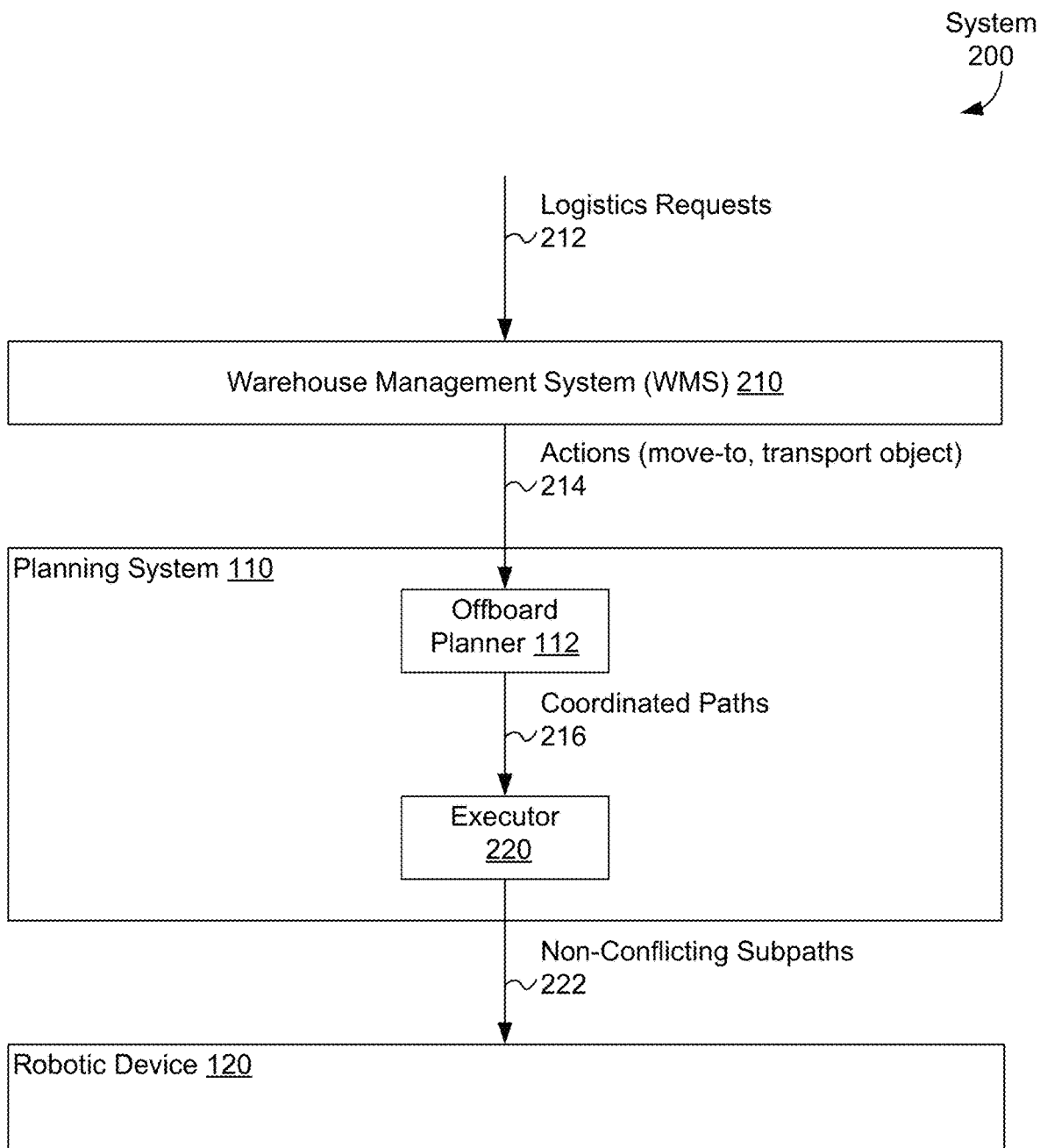
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
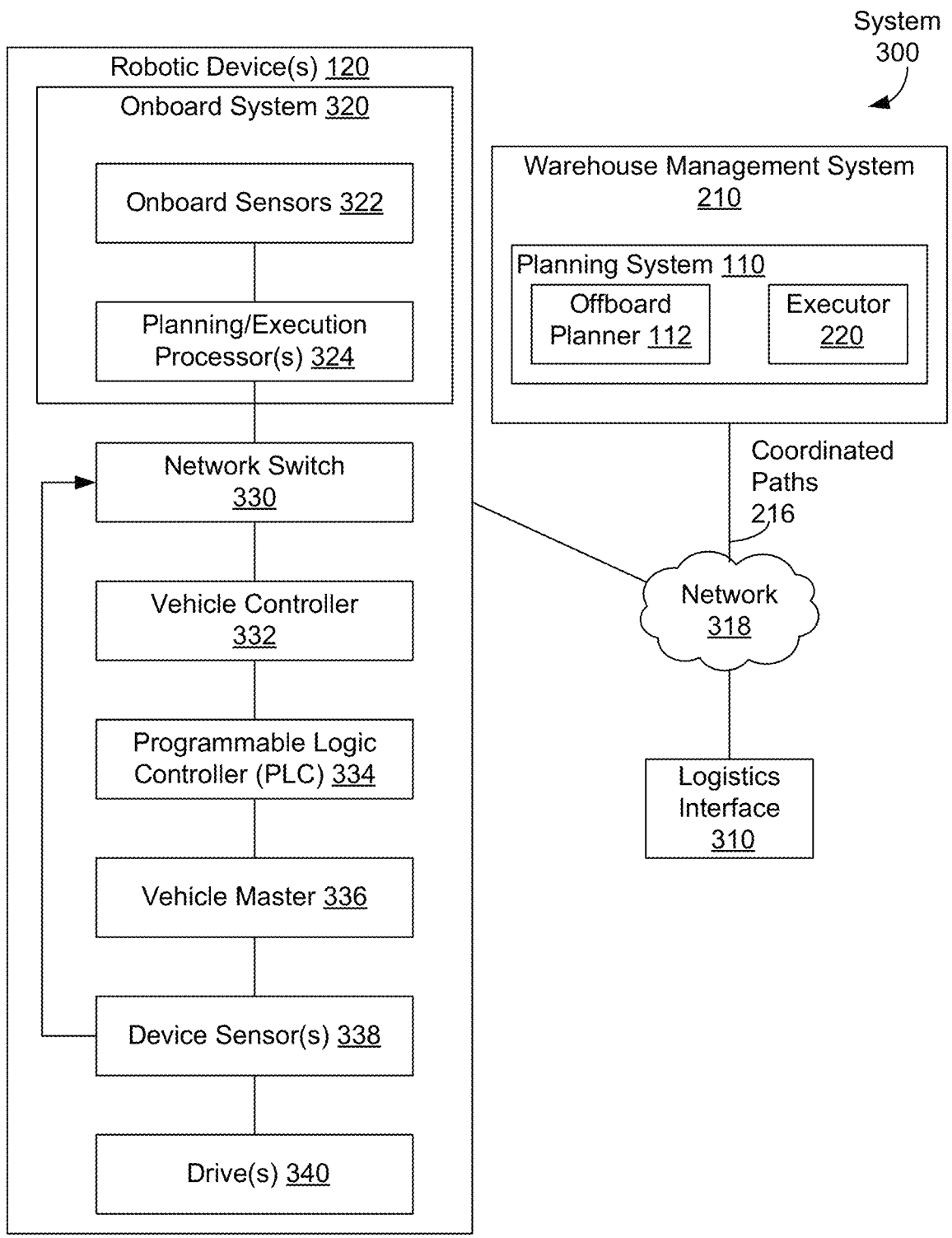
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
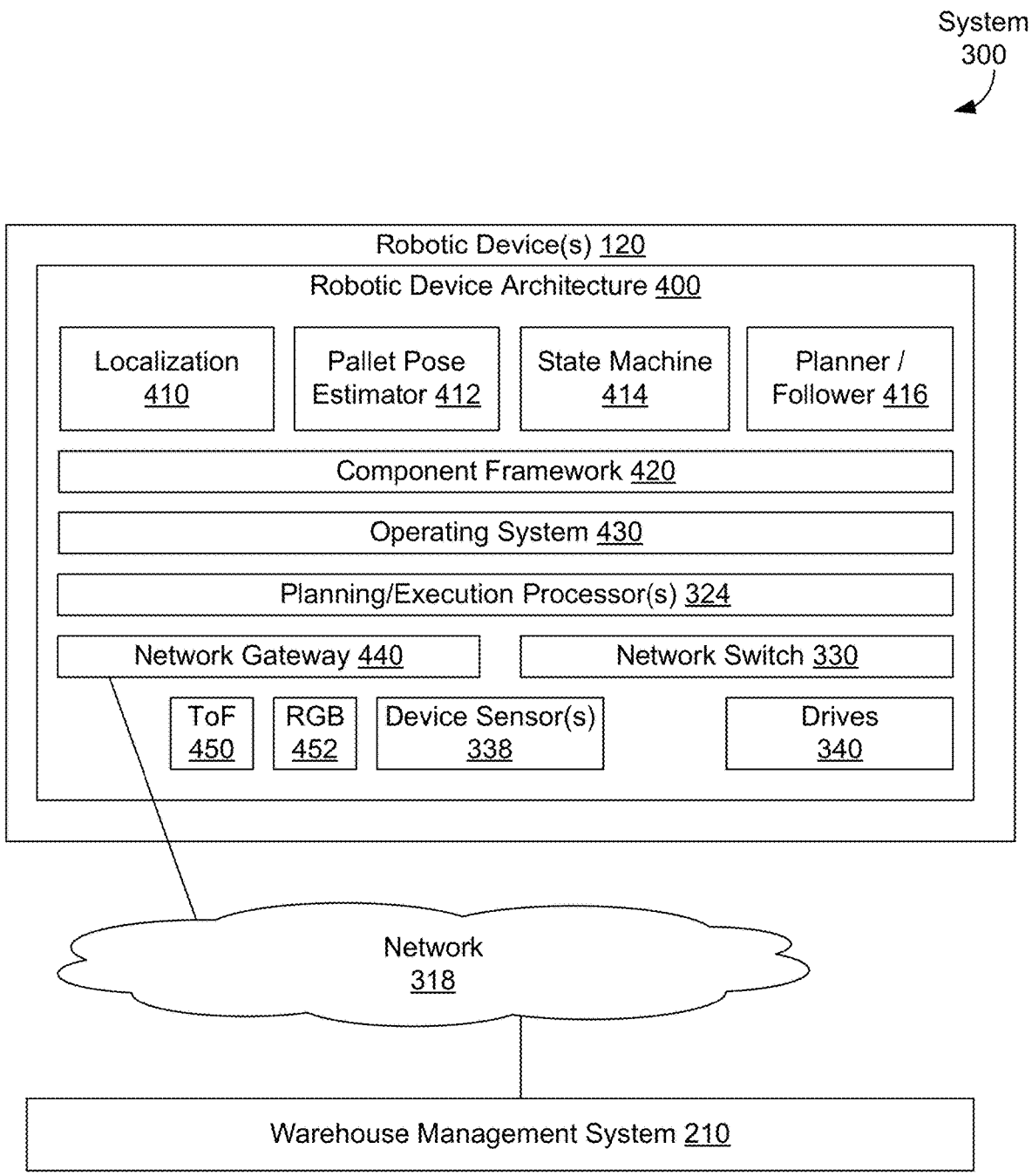
FIG. 4 illustrates a robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
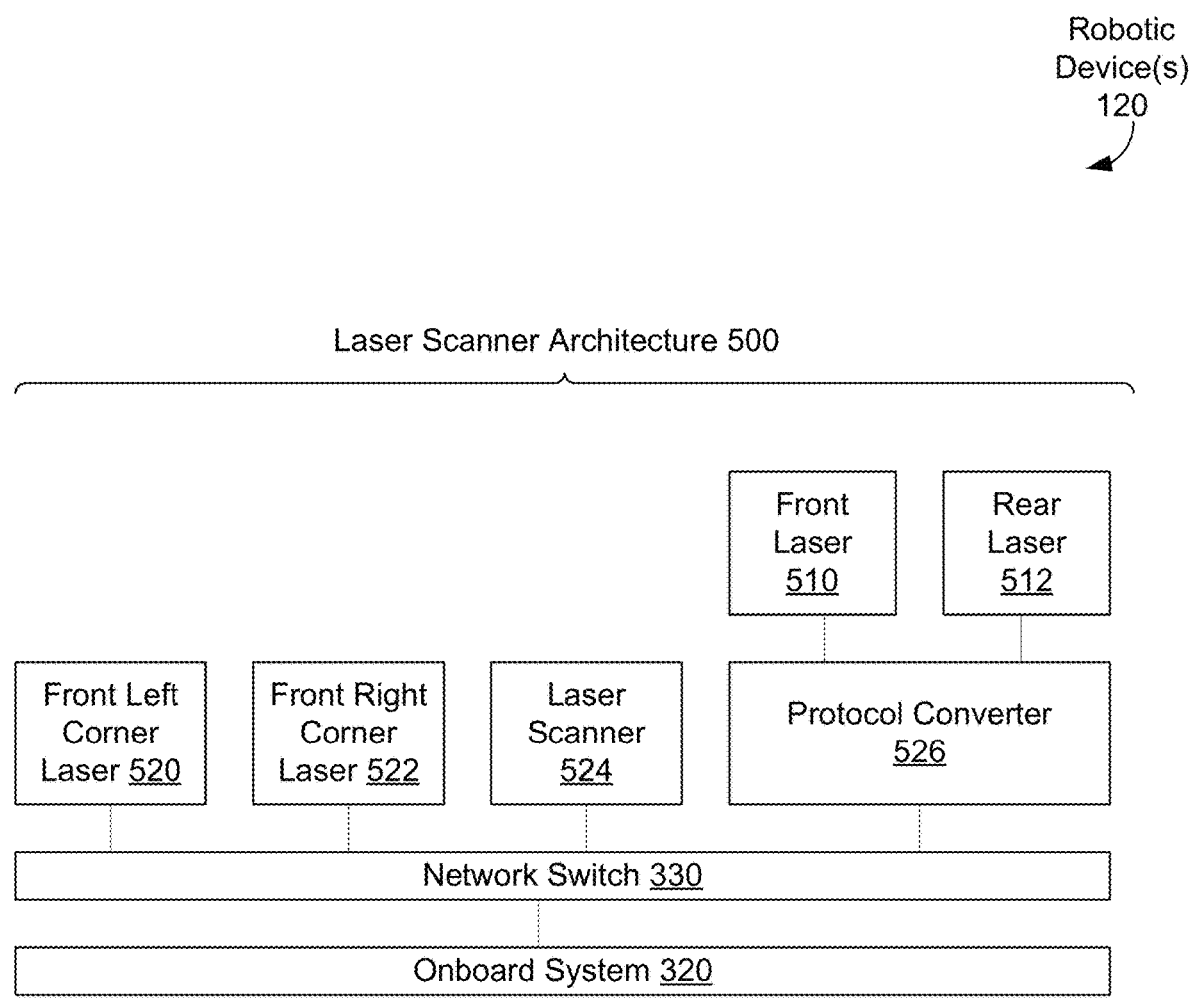
FIG. 5 illustrates a laser scanner architecture for one or more robotic devices, in accordance with an example embodiment.

FIG. 5 illustrates laser scanner architecture 500 for robotic device(s) 120, in accordance with an example embodiment.

In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
| --- | --- | --- |
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe | Robotic device will halt and notify human operator. The operator can intervene by manually driving robotic device around obstacle. |

TABLE 1-continued

| Name | Summary | Recovery Strategy |
|---|---|---|
| | distance from known obstacles. | |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. LOCALIZATION OF ROBOTIC VEHICLES WITHIN AN ENVIRONMENT

Figure 6:
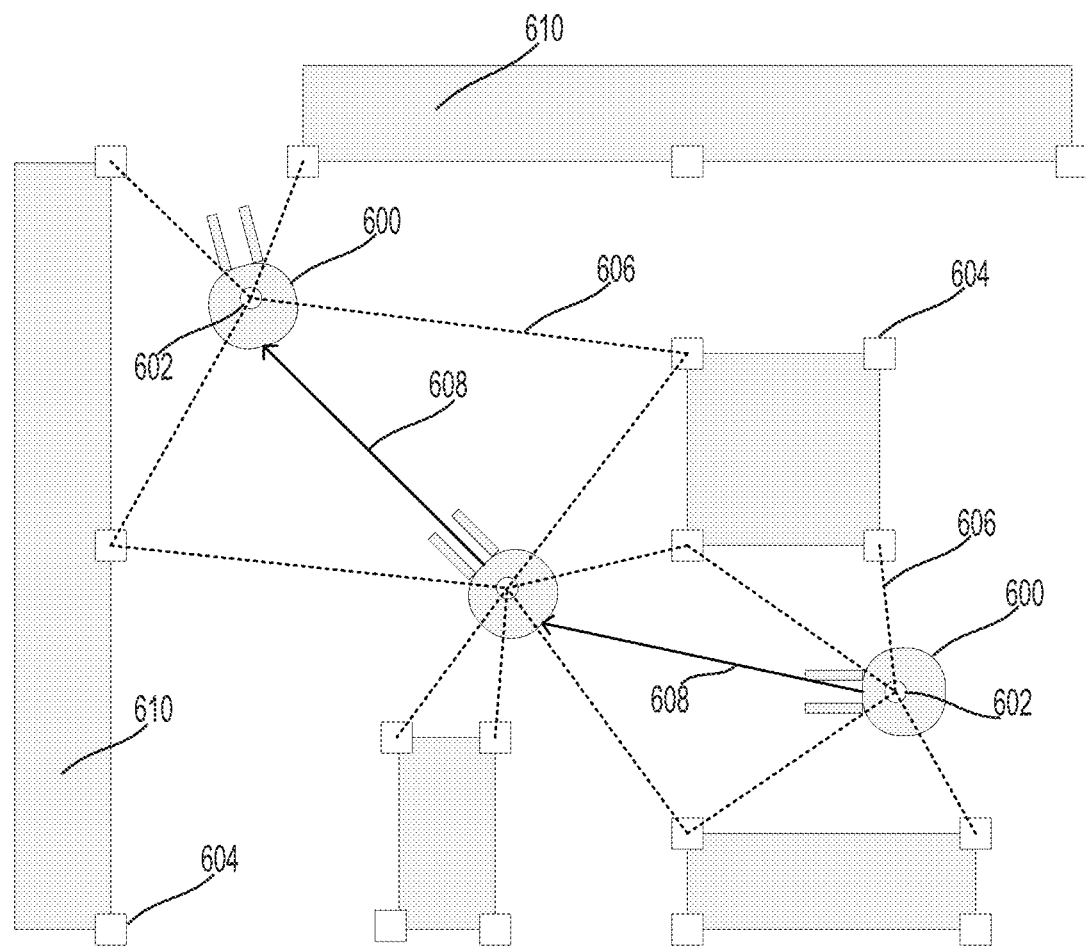
FIG. 6 illustrates a robotic vehicle navigating within an environment, in accordance with an example embodiment.

FIG. 6 shows a robotic vehicle navigating within an environment, according to an example embodiment. A location and orientation of a robotic vehicle 600 may be estimated, and the robot may navigate through the environment accordingly. The location and orientation of the robotic vehicle may be referred to as the "pose" of the robotic vehicle. The pose of the robotic vehicle may be estimated based on received signals 606 by one or more sensors 602 on the robotic vehicle. The received signals may be associated with landmarks 604 distributed throughout the environment. For example, the signals may be reflected by retroreflective markers placed in various locations in a warehouse. In this example, the robotic vehicle may include a light ranging and detection (LIDAR) unit that emits light to an area surrounding the robotic vehicle, and retroreflectors positioned in the area surrounding the robotic vehicle may reflect the light back to the robotic vehicle for detection by the one or more sensors of the robotic vehicle.

In some examples, the received signals may indicate locations of the landmarks relative to the robotic vehicle. Further, the locations of the landmarks within the environment may be predetermined. For example, the landmarks may be mapped. Matching the received signals with corresponding mapped landmarks may allow the pose of the robot within the environment to be inferred. For example, the robot may align the detected landmarks with the mapped landmarks to determine its position on the map. Further, the locations of the landmarks in relation to obstacles 610 within the environment may be predetermined. For example, the locations of obstacles may also be mapped. The robot may make movements 608 to navigate within the environment while avoiding the obstacles based on the estimated pose and the predetermined locations of the obstacles.

Figure 7:
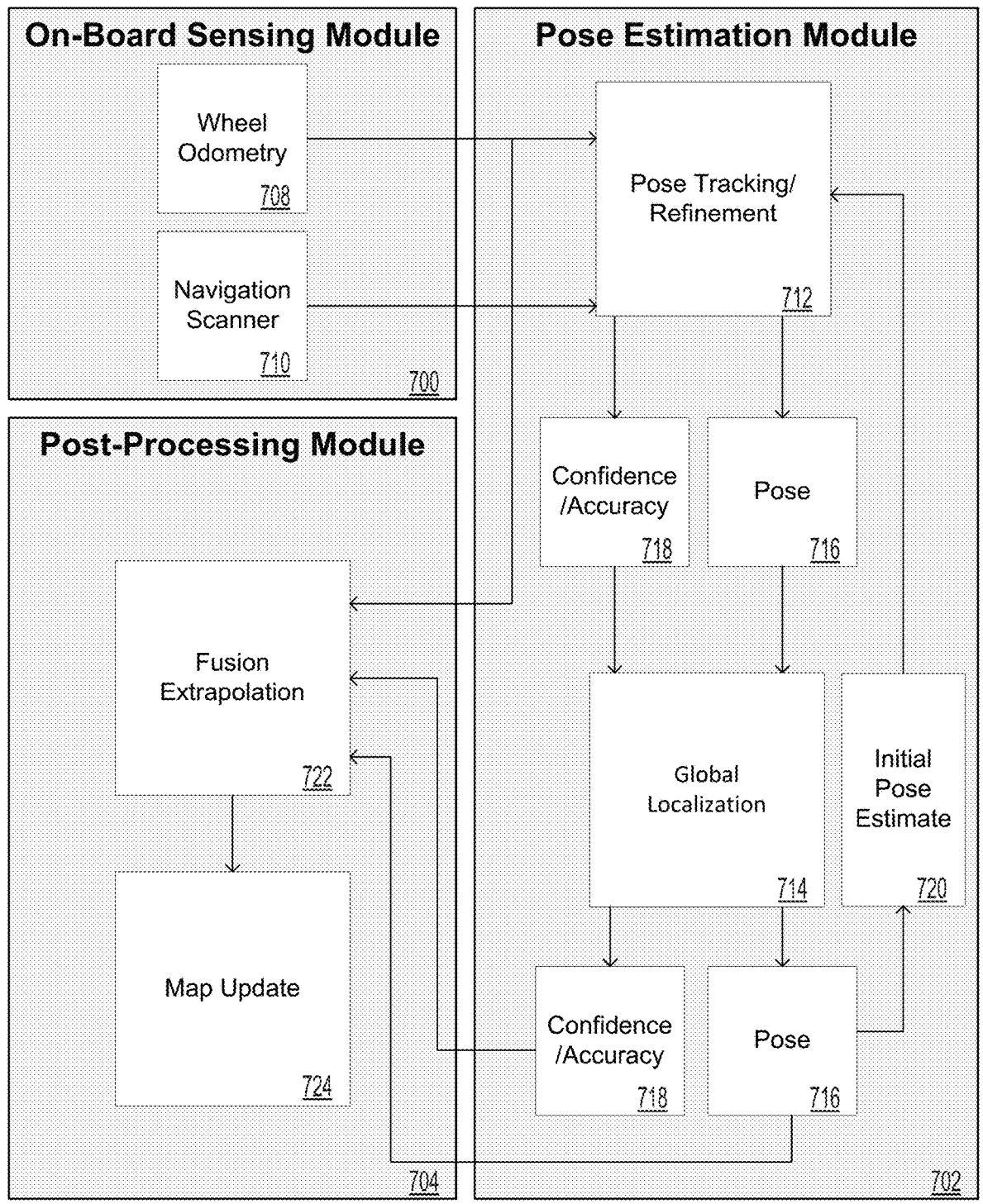
FIG. 7 is a functional block diagram illustrating modules of a robot control system, in accordance with an example embodiment.

FIG. 7 is a functional block diagram illustrating modules of a robot control system, according to an example embodiment. The robot control system may include one or more sensors as part of an on-board sensing module 700. The sensors may provide data that is indicative of wheel odometry 708 of the robotic vehicle. The sensors may also include a navigation scanner 710. The navigation scanner 710 may be configured to receive signals from candidate landmarks in an environment of the robot.

A pose estimation module 702 of the robot control system may indicate the location and orientation of the robotic vehicle with respect to mapped landmarks in the environment. The pose estimation module 702 may include software that performs functions based on inputs from the on-board sensing module 700. For example, each time the navigation scanner 710 performs a scan, sensor data from the on-board sensing module may be processed by the pose estimation module 702 to determine a current location and orientation of the robotic vehicle in the environment. The pose tracking/refinement block 712 and global localization block 714 of the pose estimation module 702 represent processing steps, while the pose block 716, confidence/accuracy block 718, and initial pose estimate block 720 represent outputs of the processing blocks 712 and 714.

The pose estimation module 702 may operate in two modes. In a first mode, the pose estimation module 702 may have an initial pose estimate 720 of the robot, and the pose tracking/estimate block 712 may update the initial pose estimate 720. The pose tracking/refinement 712 may utilize the wheel odometry 708 and data from the navigation scanner 710 in conjunction with the initial pose estimate 720 to identify the location of the robotic vehicle in relation to candidate landmarks. The pose tracking/refinement block 712 may associate the candidate landmarks to particular mapped landmarks that are near to the initial pose estimate 720. The pose estimation module 702 may further provide a pose estimate 716 based on the association, and a confidence/accuracy 718 of the pose estimate. The confidence/accuracy 718 may indicate that the initial pose estimate is adequate, or that it requires further refinement. Also in the first mode, the pose 716 and confidence/accuracy 718 determined by the pose tracking/refinement block 712 may be used in the post-processing module 704 to determine a refined pose estimate of the robot. Meanwhile, the global localization block 714 may be skipped. Further, the pose estimate 716 derived during pose tracking/refinement 712 may be treated as the initial pose estimate 720 of the robotic vehicle for use in subsequent pose estimations.

In a second mode, the pose estimation module 702 may have no initial indication of where the robotic vehicle is within the environment. In other words, the initial pose estimate 720 may not yet be determined. In the second mode, the pose estimation module 702 may utilize global localization 714 rather than pose tracking/refinement 712 to determine the pose of the robot. The global localization block 714 may test associations between the candidate landmarks and mapped landmarks across the entire environment of the robotic vehicle. The global localization block 714 may also output a pose estimate 716 and confidence/accuracy 718. Also in the second mode, the pose 716 and confidence/accuracy 718 determined by the global localization block 714 may be used in the post-processing module 704 to determine a refined pose estimate of the robot. Further, the pose estimate 716 derived during global localization 714 may be treated as the initial pose estimate 720 of the robotic vehicle for use in subsequent pose estimations.

A post-processing module 704 may be used to refine the pose estimation derived from the pose tracking/refinement or global localization. The post-processing module may perform fusion extrapolation 722 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module may provide a map update 724 based on the provided confidence/accuracy and refined pose estimate. For example, the map update may update locations of the mapped landmarks based on the refined pose estimate. In other examples, the map update may update statistical information associated with the mapped landmarks used to generate the refined pose estimation.

Each of the functions performed by the robot control system of FIG. 7 may be performed periodically. For example, navigation scanner 710 may perform scans at 8 Hz, while the wheel odometry 708 may update at 100 Hz. As another example, the processing blocks 712 and 714 of the pose estimation module may receive data from the on-board sensing module at 8 Hz, and may produce poses 716 and confidence/accuracies 718 at 8 Hz. Different frequencies are possible as well.

Figure 8:
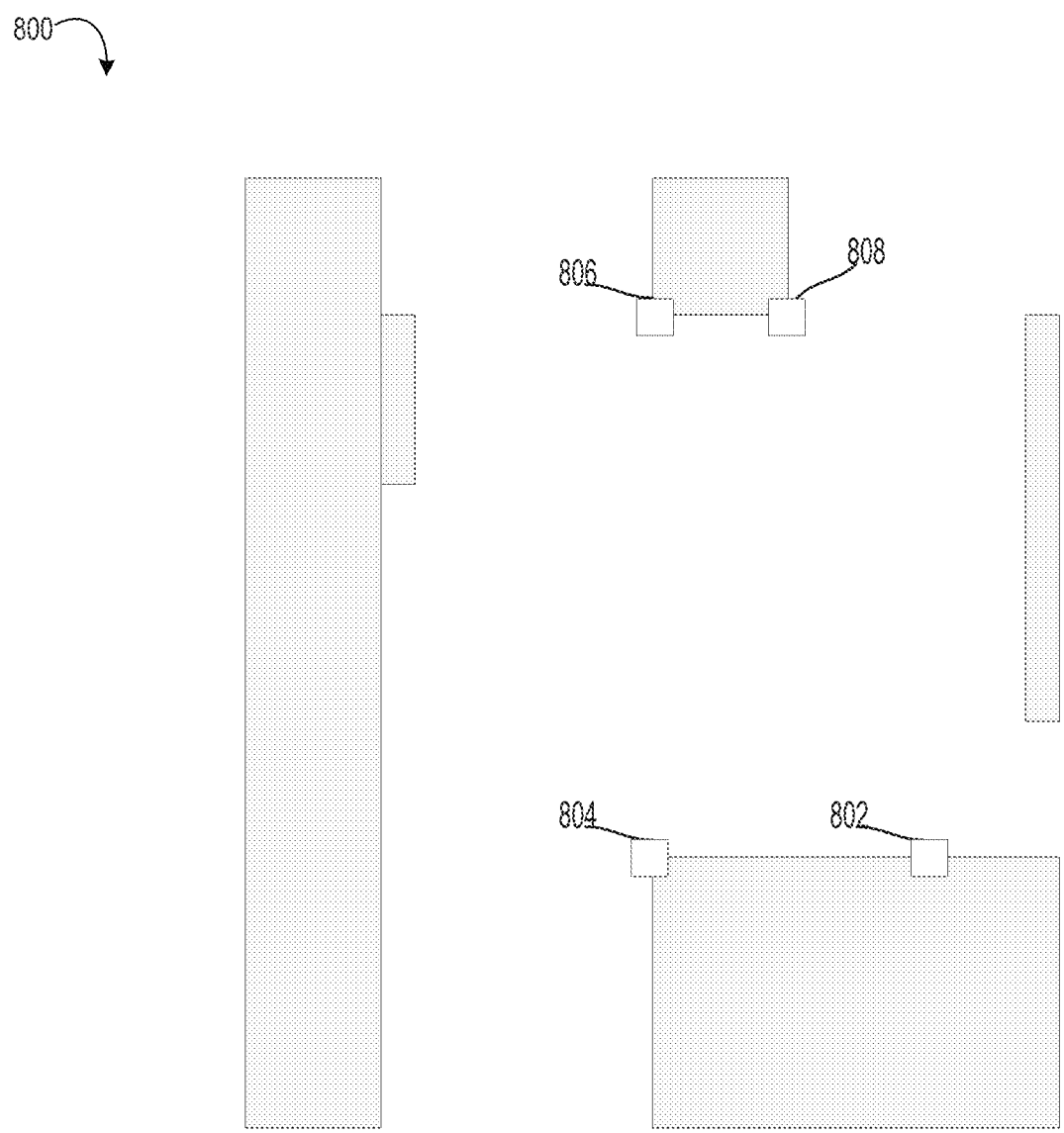
FIG. 8 shows a mapped environment of a robot, in accordance with an example embodiment.

FIG. 8 shows an environment of a robotic vehicle, according to an example embodiment. Generating a pose estimate of the robot may rely on predetermined locations of landmarks within the environment 800. For example, mapped landmark 802 may correspond to a first coordinate (x1, y1) on the map, mapped landmark 804 may correspond to a second coordinate (x2, y2), mapped landmark 806 may correspond to a third coordinate (x3, y3), and mapped landmark 808 may correspond to a fourth coordinate (x4, y4). In this example, only an x and y axis may be relevant, because the mapped landmarks may be distributed on a substantially horizontal marker plane. For example, each landmark the environment 800 may be positioned at a height (corresponding to a z axis) of 5 feet above the floor. In other examples, the mapped landmarks may correspond to ranges of coordinates on a map. For example, the ranges of coordinates may correspond to sizes of the various landmarks. In still other examples, the mapped landmarks may correspond to three-dimensional (3-D) coordinates on a (3-D) map. Other ways of representing locations of the mapped landmarks are possible as well.

In some example embodiments, the mapped landmarks may be retroreflective markers configured to reflect light back to a source of the light. In such examples, the robotic vehicle may include a light ranging and detection (LIDAR) unit configured to emit light to an area surrounding the robot. The retroreflective markers may reflect signals from the LIDAR unit back to the robotic vehicle. The robotic vehicle may include one or more sensors of the robotic vehicle, which may be configured to receive reflected signals from the retroreflective markers and detect locations of the markers relative to the robotic vehicle.

Figure 9:
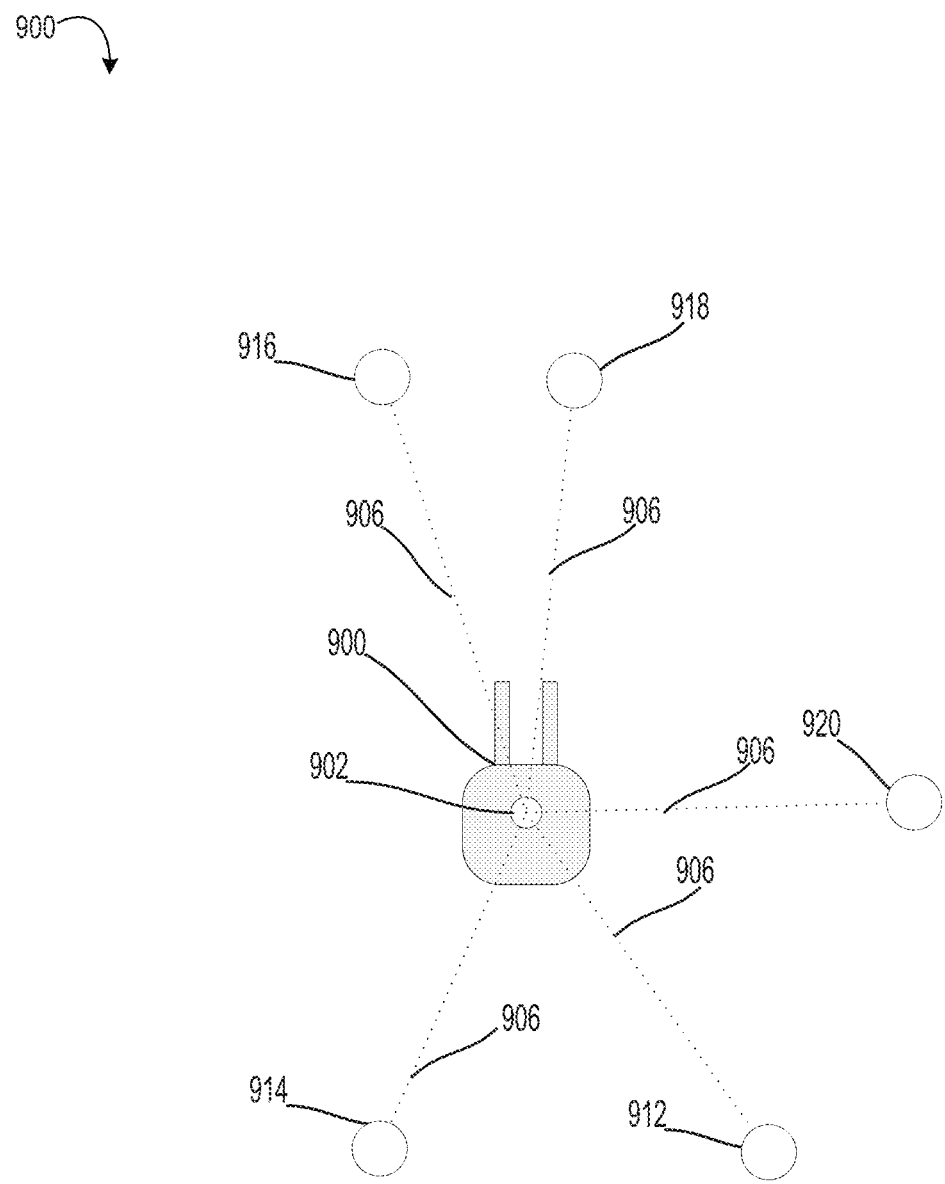
FIG. 9 shows a robot having made a number of detections, in accordance with an example embodiment.

FIG. 9 shows a robotic vehicle having made a number of detections, according to an example embodiment. Generating a pose estimate of the robotic vehicle may further rely on signals 906 detected by one or more sensors 902 of the robotic vehicle 900. In one example, the signals may be associated with candidate landmarks 912, 914, 916, 918, and 920. The signals may be indicative of locations of the candidate landmarks in relation to the robot. For example, candidate landmark 912 may correspond to a radius relative to the robotic vehicle 900 (r1), candidate landmark 1014 may correspond to a radius (r2) and an angle ($\alpha$2), candidate landmark 1016 may correspond to a radius (r3) and an angle ($\alpha$3), candidate landmark 1018 may correspond to a radius (r4) and an angle ($\alpha$4), and candidate landmark 1020 may correspond to a radius (r5) and an angle ($\alpha$5). In other examples, the candidate landmarks may be represented by Cartesian coordinates relative to the robotic vehicle 900. Other ways of representing locations of the candidate landmarks relative to the robotic vehicle are possible as well.

In some examples, the locations of the candidate landmarks may be determined by at least one sensor on the robotic vehicle. That is, a sensor may receive signals indicative of locations of candidate landmarks. The sensor may generate sensor data representative of the received signals, and may determine the locations of the candidate landmarks based on the sensor data. A control system of the robot may then receive the locations of the candidate landmarks from the sensor. In other examples, at least one sensor may generate raw sensor data and one or more processors of the robot may process the raw sensor data to determine the locations of the candidate landmarks. For example, the processors may identify signals from a sensor on the robot that have an intensity greater than an intensity threshold value. In still other examples, processors that are remote from the robot may detect the locations of the candidate landmarks based on the sensor data. Other ways of determining the locations of the candidate landmarks are possible as well.

The candidate landmarks may or may not correspond to a mapped landmark. For example, candidate landmarks 912, 914, 916 and 918 may correspond to mapped landmarks (e.g. the mapped landmarks 802, 804, 806, and 808 of FIG. 8), while candidate landmark 920 may correspond to a false detection. False detections may make it difficult to align the candidate landmarks with corresponding mapped landmarks, and thus may hinder accurate pose estimates of the robotic vehicle. Example embodiments follow that describe methods of vetting the candidate landmarks to achieve accurate pose estimates.

Figure 10A:
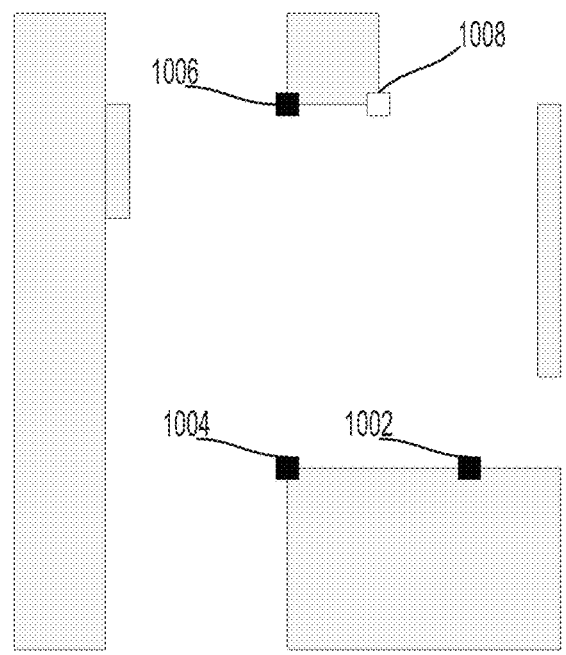
FIGS. 10A, 10B, 10C, and 10D illustrate determination of inliers associated with a sample set of candidate landmarks and corresponding mapped landmarks, in accordance with an example embodiment.
Figure 10B:
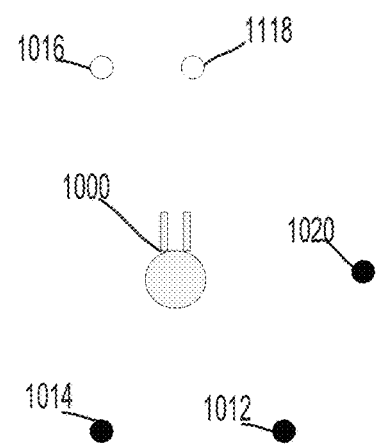

FIGS. 10A, 10B, 10C, and 10D illustrate determination of inliers associated with a sample set of candidate landmarks and corresponding mapped landmarks, according to an example embodiment. FIG. 10A shows a mapped environment of a robotic vehicle. Mapped landmarks 1002, 1004, 1006, and 1008 have predetermined locations. FIG. 10B shows a robotic vehicle having made a number of detections. The detections correspond to candidate landmarks 1012, 1014, 1016, 1018, and 1020. For purposes of the present example, candidate landmark 1020 corresponds to a false detection, while the other candidate landmarks correspond to mapped landmarks. To estimate a pose of the robotic vehicle and to determine which, if any, of the candidate landmarks correspond to false detections, sample sets of the candidate landmarks mapped landmarks may be selected.

In the example embodiment, a sample set is determined that includes candidate landmarks 1012, 1014, and 1020, and corresponding mapped landmarks 1002, 1004, and 1006. In the present example, three candidate landmarks have been sampled. However, different numbers of sampled landmarks are possible as well. For example, the number of sampled landmarks may relate to a percentage of the total number of candidate landmarks.

In some embodiments, sampling the candidate landmarks may be performed pseudo-randomly. In other embodiments, sampling the candidate landmarks may be performed in an ordered fashion. For example, sampling the candidate landmarks may be performed in order of angle relative to the robot. In other examples, sampling the candidate landmarks may be performed in order of radius relative to the robot. In still other examples, the first candidate landmark may be chosen pseudo-randomly, and the other candidate landmarks may be sampled based on their proximity to the first candidate landmark. In yet other examples, the candidate landmarks may be chosen based on a desired geometry. For example, the candidate landmarks that most closely resemble an isosceles triangle may be sampled. In another example, the candidate landmarks that most closely resemble a line may be sampled. Other ways of sampling the candidate landmarks are possible as well.

In some embodiments, corresponding mapped landmarks may be selected in a similar fashion to the sampled candidate landmarks. In other embodiments, corresponding mapped landmarks may be sampled that form a similar geometry to the sampled candidate landmarks. In present example, sampled mapped landmarks 1002, 1004, and 1006 most closely resemble the geometry formed by the sampled candidate landmarks 1012, 1014, and 1020. Other ways of sampling the corresponding mapped landmarks are possible as well.

In some embodiments, several sample sets may be determined, each including a different combination of candidate landmarks and corresponding mapped landmarks. Each of the sample sets may be vetted to determine which ones adequately represent the pose of the robot.

Figure 10C:
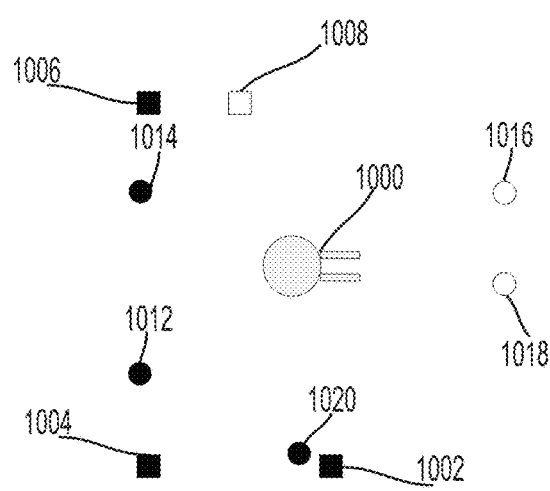

FIG. 10C shows a transformation determined based on a sample set that has been applied to all of the candidate landmarks. A transformation may be determined for the sample set that relates the sampled subset of candidate landmarks to the corresponding mapped landmarks. For example, the transformation may translate and rotate the candidate landmarks so as to minimize distances between the sampled candidate landmarks and the corresponding mapped landmarks. In this example embodiment, sampled candidate landmarks 1012, 1014, and 1020 have been oriented to minimize the overall distance from corresponding mapped landmarks 1004, 1006, and 1002. A least squares method such as an iterative closest point (ICP) algorithm may achieve this alignment. Any similar algorithm may appropriately align the sampled subset of candidate landmarks with the corresponding mapped landmarks. Other transformations are possible as well.

While the transformation may be determined based on the sampled subset of candidate landmarks and corresponding mapped landmarks, the transformation may be applied to all of the candidate landmarks. In the present example, the transformation is applied to non-sampled candidate landmarks 1016 and 1018 in addition to the sampled candidate landmarks.

Once the determined transformation has been applied to the candidate landmarks, the distances between the transformed candidate landmarks and neighboring mapped landmarks may be determined. A neighboring mapped landmark corresponding to a particular transformed candidate landmark may be a closest mapped landmark after the transformation is applied. In some examples, each mapped landmark may only serve as a neighboring mapped landmark to one transformed candidate landmark. In this example, mapped landmark 1002 is a neighboring mapped landmark of transformed candidate landmark 1020, mapped landmark 1004 is a neighboring mapped landmark of transformed candidate landmark 1012, and mapped landmark 1006 is a neighboring mapped landmark of transformed candidate landmark 1014.

The transformation may be generally indicative of a potential pose of the robot 1000. The distances between the transformed candidate landmarks and the neighboring landmarks may indicate whether or not the transformation presents a viable pose. For example, a number of inliers associated with the transformation may be determined.

Figure 10D:
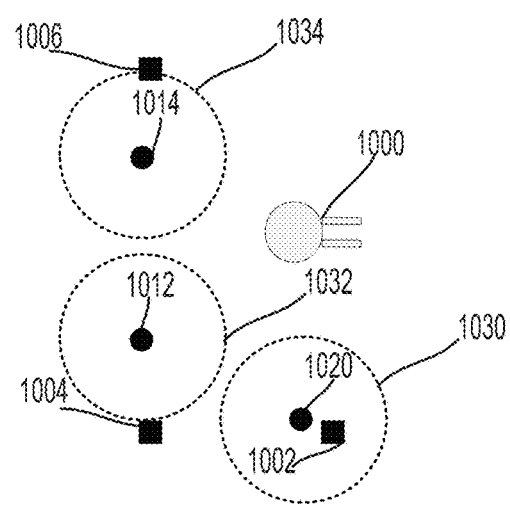

FIG. 10D shows a number of inliers associated with transformed candidate landmarks, according to an example embodiment. Each of the inliers may be determined based on an inlier distance threshold. The inlier distance threshold may be indicative of whether a transformed candidate landmark is adequately aligned with any of the mapped landmarks. In the present example, the inlier distance threshold is represented by radii 1030, 1032, and 1034, which encircle transformed candidate landmarks 1020, 1012, and 1014 respectively. Any transformed candidate landmark within the threshold distance of a neighboring mapped landmark may be considered an inlier. In the present example, transformed candidate landmarks 1012, 1014, and 1020 may be considered inliers. Not depicted in FIG. 10D are candidate landmarks 1016 and 1018, which are not considered inliers. Also not depicted in FIG. 10D is mapped landmark 1008 which is not within the inlier distance threshold of any of the transformed candidate landmarks.

A sampled subset that includes a false detection may result in a transformation that does not adequately represent the pose of the robot. In the present example, candidate landmarks 1012, 1014, 1016, and 1018 correspond to mapped landmarks, respectively, while candidate landmark 1020 corresponds to a false detection. FIGS. 10C and 10D show an example embodiment of a transformation that does not adequately represent the pose of the robot because the sampled subset includes a false detection.

In the present example, three inliers are determined from five transformed candidate landmarks. In other words, three out of five candidate landmarks can be considered adequately aligned based on the transformation. It may be determined that three out of five candidate landmarks having inliers does not correspond to a viable transformation, which in turn does not indicate a viable pose of the robot. Other factors may contribute to a determination that the transformation is not viable. In FIGS. 11A-D, for example, none of the non-sampled candidate landmarks are associated with an inlier. It may be common for the transformed sampled candidate landmarks to be associated with inliers, because the determined transformation is meant to best align the sampled candidate landmarks to the corresponding mapped landmarks. Thus, whether the non-sampled candidate landmarks are associated with inliers may be given more weight in determining the viability of the transformation. In examples where the number of inliers is determined to be insufficient, other candidate landmarks and corresponding mapped landmarks may be sampled, the other candidate landmarks may be transformed, and a number of inliers associated with the other candidate landmarks may be determined.

FIGS. 11A, 11B, 11C, and 11D illustrate determination of inliers associated with another sample set of candidate landmarks and corresponding mapped landmarks, according to an example embodiment. FIG. 11A shows the same mapped environment of a robotic vehicle as depicted in FIG. 10A. Similarly, FIG. 11B shows a robotic vehicle having made the same detections as those depicted in FIG. 11B. However, FIGS. 11A and 11B depict a different sample set. In the present example, candidate landmarks 1114, 1116, and 1118 and corresponding mapped landmarks 1104, 1106, and 1108 are sampled. FIG. 11C shows a transformation determined from the sample set as applied to all of the candidate landmarks. In the present example, the transformation is determined based on sampled candidate landmarks 1114, 1116, and 1118 and corresponding mapped landmarks 1104, 1106, and 1108. The transformation is also applied to non-sampled landmarks 1112 and 1120. FIG. 11D shows a number of inliers associated with transformed candidate landmarks aligned with map landmarks. Sampled candidate landmarks 1114, 1116, and 1118 are inliers because they correspond to neighboring mapped landmarks 1104, 1106, and 1108, which are within radii 1134, 1136 and 1138 of the sampled candidate landmarks. Non-sampled candidate landmark 1112 is also an inlier, because neighboring mapped landmark 1102 is within radius 1132 of candidate landmark 1112. However, candidate landmark 1120 is an outlier, because no mapped landmarks fall within an inlier threshold distance associated with candidate landmark 1120.

FIG. 11D shows an example embodiment that includes four inliers out of five candidate landmarks. It may be determined that four out of five candidate landmarks having inliers corresponds to a viable transformation, which in turn indicates a viable pose of the robot. This determination may be made because there are a total of four sampled and neighboring landmarks 1102, 1104, 1106, and 1108. Thus, determining four inliers in the present example is indicative of a transformation that adequately aligns candidate landmarks with each and every relevant mapped landmark. Other factors may contribute to a determination that the transformation is viable. In FIG. 11D, for example, one of the non-sampled candidate landmarks is associated with an inlier. It may be significant for non-sampled candidate landmarks to be associated with an inlier, because a transformation that derives from one or more false detections is less likely to allow for inliers associated with non-sampled candidate landmarks, as shown by FIGS. 11A-11D.

In the present example, the transformation may be deemed viable. As such, the sample set from which the transformation may be selected and a pose estimate may be determined based on the transformation. For example, the pose of the robotic vehicle may be estimated based on the inliers associated with the selected sample set. Further, any outliers associated with the sample set may be determined to correspond to false detections. In the present example, candidate landmark 1120 may be determined to correspond to a false detection.

FIGS. 11A-11D show that a sampled subset that only includes candidate landmarks that correspond to mapped landmarks may result in a transformation that adequately represents the pose of the robot. While FIGS. 10A-10D showed how false detections far from any mapped landmarks can render a transformation inadequate, and thus result in a poor pose estimate, false detections may be used to assist in determining a confidence level associated with the pose estimate. Example embodiments follow that describe methods of using false detections to determine a confidence level associated with a pose estimate.

As described above with regard to FIG. 7, a confidence level may be associated with each pose estimate of a robotic vehicle. The confidence level may be determined based on the number of inliers associated with a transformation of detected candidate landmarks and the total number of detected candidate landmarks. For example, the present example includes four inliers out of five candidate landmarks. A confidence level of the resulting pose estimate may be based on a ratio of the number of inliers to the total number of candidate landmarks. In this example, a ratio close to one would indicate a high likelihood of an accurate pose estimate. Conversely, a ratio close to zero would indicate a low likelihood of an accurate pose estimate. In another example, the confidence level may be based on a ratio of the number of inliers to the number outliers. In this example, a ratio much greater than one, such as five, would indicate a high likelihood of an accurate pose estimate, while a ratio closer to, or less than, one would indicate a low likelihood of an accurate pose estimate. Other ways of measuring a confidence level are possible as well, as discussed below.

In some examples, the pose estimation confidence may be considered in determining a refined pose estimate. For instance, a selected sampled subset with a high pose estimation confidence may be the primary contributor to the refined pose estimate. A selected sampled subset with a low pose estimate confidence may be a secondary contributor to the refined pose estimate. For example, the refined pose estimate may derive from wheel odometry moreso than from the selected sample set. In this way, completing the pose estimate may be reminiscent of Kalman filtering.

FIGS. 12A, 12B, 12C, and 12D illustrate mapping of false detections according to an example embodiment. Mapping the false detections may assist in using candidate landmarks determined to correspond to false detections to determine a confidence level associated with a pose estimate.

FIG. 12A illustrates an environment of a robotic vehicle, in accordance with an example embodiment. The environment may include a plurality landmarks, such as landmarks 1202, 1204, 1206, and 1208. The landmarks may be placed on features, such as obstacles within the environment. In an example embodiment, the environment may be a warehouse environment, as described above. Such an environment may include a plurality of obstacles, and the landmarks may be placed on certain of the obstacles. As described above, in some examples, the landmarks may include retroreflective markers configured to reflect light back to a source of the light. In such examples, the robot may include a light ranging and detection (LIDAR) unit configured to emit light to an area surrounding the robot. In such examples, reflective surfaces may become sources of false detections, because the LIDAR device may emit a light signal, and reflective sources normal to the path of the emitted light may reflect the signal back to the one or more sensors on the robotic vehicle. In the present example, such a reflective surface is depicted as surface 1210. While the forthcoming description is generally applicable to retroreflectors and reflective surfaces, it should be readily understood that such an environment may additionally, or alternatively include other types of landmarks, such as particularly colored regions of the environment, particular arrangements of edges within the environment, or Quick Response (QR) code markers placed within the environment. Each such landmark type may be associated with a corresponding type of false detection source. Other types of landmarks and corresponding false detection sources are possible as well.

FIG. 12B illustrates a robotic vehicle having made a number of detections, in accordance with an example embodiment. Generating a pose estimate of the robot may further rely on signals detected by one or more sensors of the robotic vehicle 1200. In one example, the signals may be associated with candidate landmarks 1212, 1214, 1216, 1218, and 1220. As described above with regard to FIG. 9, locations of the candidate landmarks may be determined relative to the vehicle.

In the present example, candidate landmarks 1212, 1214, 1216, and 1218 may correspond to landmarks 1202, 1204, 1206, and 1208 respectively. Further, candidate landmark 1220 may correspond to a false detection from reflective surface 1210. Thus, reflective surface 1210 may be referred to as a false detection source. Determining which candidate landmarks correspond to a landmark and which correspond to a false detection may require processing. It should be understood that the pose of robotic vehicle 1200 as depicted in FIG. 12B is arbitrary, to illustrate that detecting the candidate landmarks alone may not be determinative of where the robotic vehicle is within the environment.

FIG. 12C shows a mapped environment of a robotic vehicle, in accordance with an example embodiment. In the present example, detected landmarks 1212, 1214, 1216, and 1218 are aligned with representations of mapped landmarks 1202, 1204, 1206, and 1208. Aligning the candidate landmarks with the representations of the mapped landmarks may be performed by a transformation, as discussed above with regard to FIGS. 10A-D and 11A-D. In the present example, candidate landmarks 1212, 1214, 1216, and 1218 may be determined to be inliers, while candidate landmark 1220 may be determined to be an outlier. Accordingly, candidate landmarks 1212, 1214, 1216, and 1218 may be used to estimate a pose of the robotic vehicle 1200.

Though the description of FIG. 12C only describes one example of determining which detected candidate landmarks correspond to mapped landmarks and which correspond to false detections, other such methods are possible. For example, additional filtering, thresholding, or statistical analysis of data corresponding to the detected candidate landmarks may assist in making this determination. As such, any method of determining which candidate landmarks correspond to mapped landmarks and which correspond to false detections may be used for purposes of this disclosure.

FIG. 12D illustrates an updated map of an environment of a robotic vehicle that includes an indication of a false detection, in accordance with an example embodiment. Having transformed the candidate landmarks to align them on the map, as described above with regard to FIG. 12C, the robotic vehicle or computing system associated with the robotic vehicle may update the map of the environment to include an indication of the false detection source location 1220. In the present example, the indication 1220 is presented as an "X", though any indication of a false detection is possible. For example, because the map of the environment may simply be stored in a computer readable medium, such as a non-transitory computer readable medium, the indication may simply take the form of a characteristic in a data structure associated with the map that is representative of a false detection. The false detection source indication 1220 may correspond to a false detection source region. Though, in the present example, only a single false detection, and a single detection source indication 1220 is provided, it should be understood that several false detections may be determined, and that these false detections may correspond to one or more false detection source regions.

Figure 13:
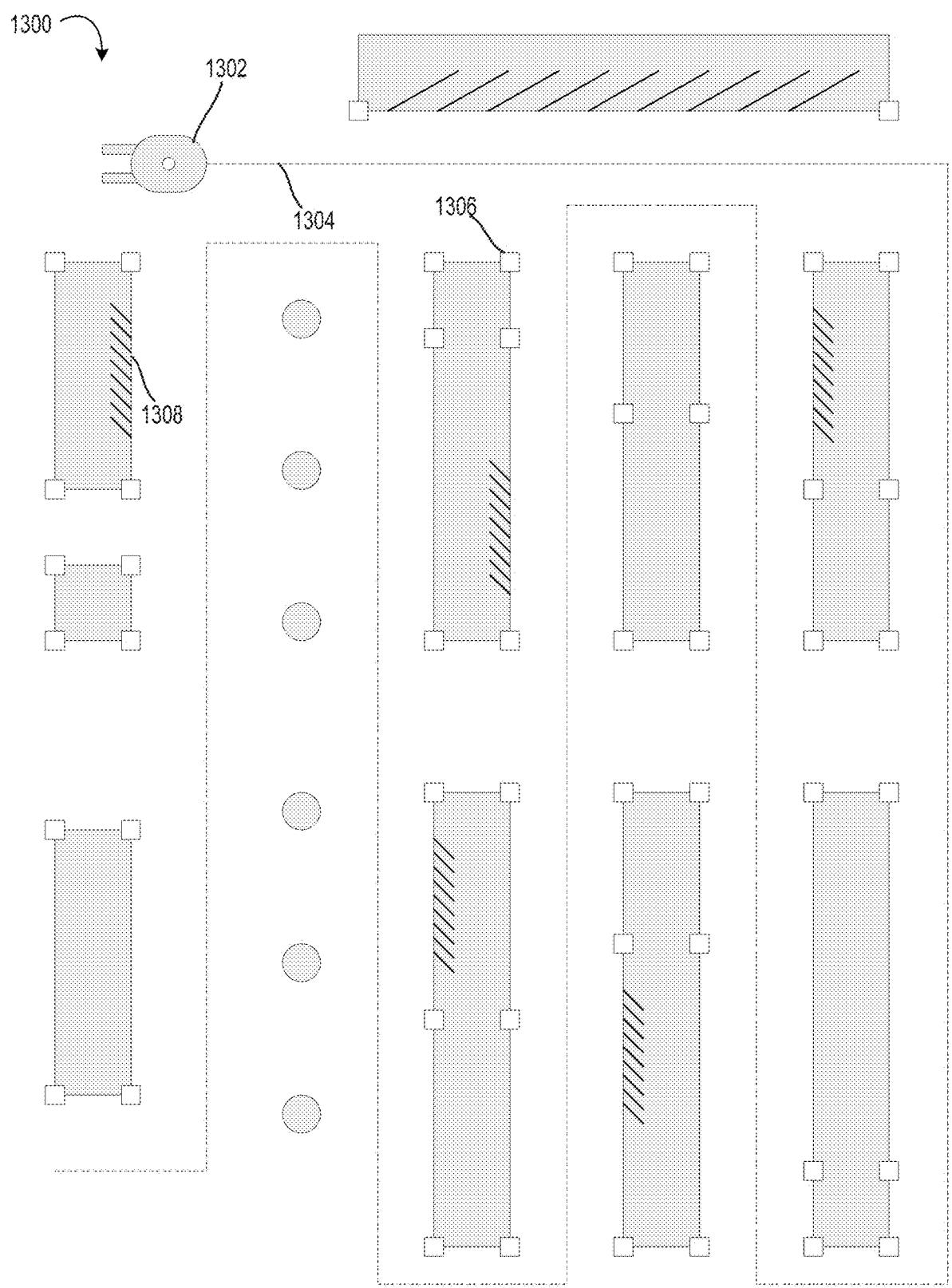
FIG. 13 illustrates a robotic vehicle navigating through an environment of the robotic vehicle to obtain sensor data, in accordance with an example embodiment.

FIG. 13 illustrates a robotic vehicle navigating through an environment of the robotic vehicle to obtain sensor data, in accordance with an example embodiment. FIG. 12D illustrates an example map of an environment where a single false detection has been determined from sensor data on the robotic vehicle. However, a robotic vehicle may navigate through the environment to obtain additional sensor data and determine additional false detections for use in updating the map of the environment. In an example embodiment, a robotic vehicle 1302 may navigate through an environment 1300 of the robotic vehicle along a path 1304. As the robotic vehicle passes by false detection source 1308, such as a reflective surface described above with regard to FIG. 12A, the robotic vehicle may successively detect subsets of candidate landmarks within the environment, and may determine which of the candidate landmarks correspond to mapped landmarks 1306, and which correspond to false detections. As false detections are determined, the robotic vehicle or a computing system may update the map to include indications of the false detections. Particularly, the map may be updated to provide indications of false detection source locations. When the candidate landmarks are used to estimate a pose of the robotic vehicle as described above, the robotic vehicle or computing system may update the map as the robotic vehicle navigates through the environment. In other examples, data representative of the false detections may be stored in a computer readable medium, such as a non-transitory computer readable medium, such that the map may be updated after the robotic vehicle 1302 navigates through environment 1300. Additionally, in some examples, such data may come from sensors coupled to a plurality of robotic vehicles. As the robotic vehicles perform tasks, or navigate within the environment 1300, each may take similar sensor data. In these examples, each robotic vehicle may individually update the map, or may provide data to a central data repository that takes all such data into account when updating the map. For example, a central controller unit communicatively coupled to the robotic vehicles may provide a map for use by any robotic vehicle in the environment, and the central controller may also provide updates to the map based on sensor data obtained by the robotic vehicles.

Figure 14:
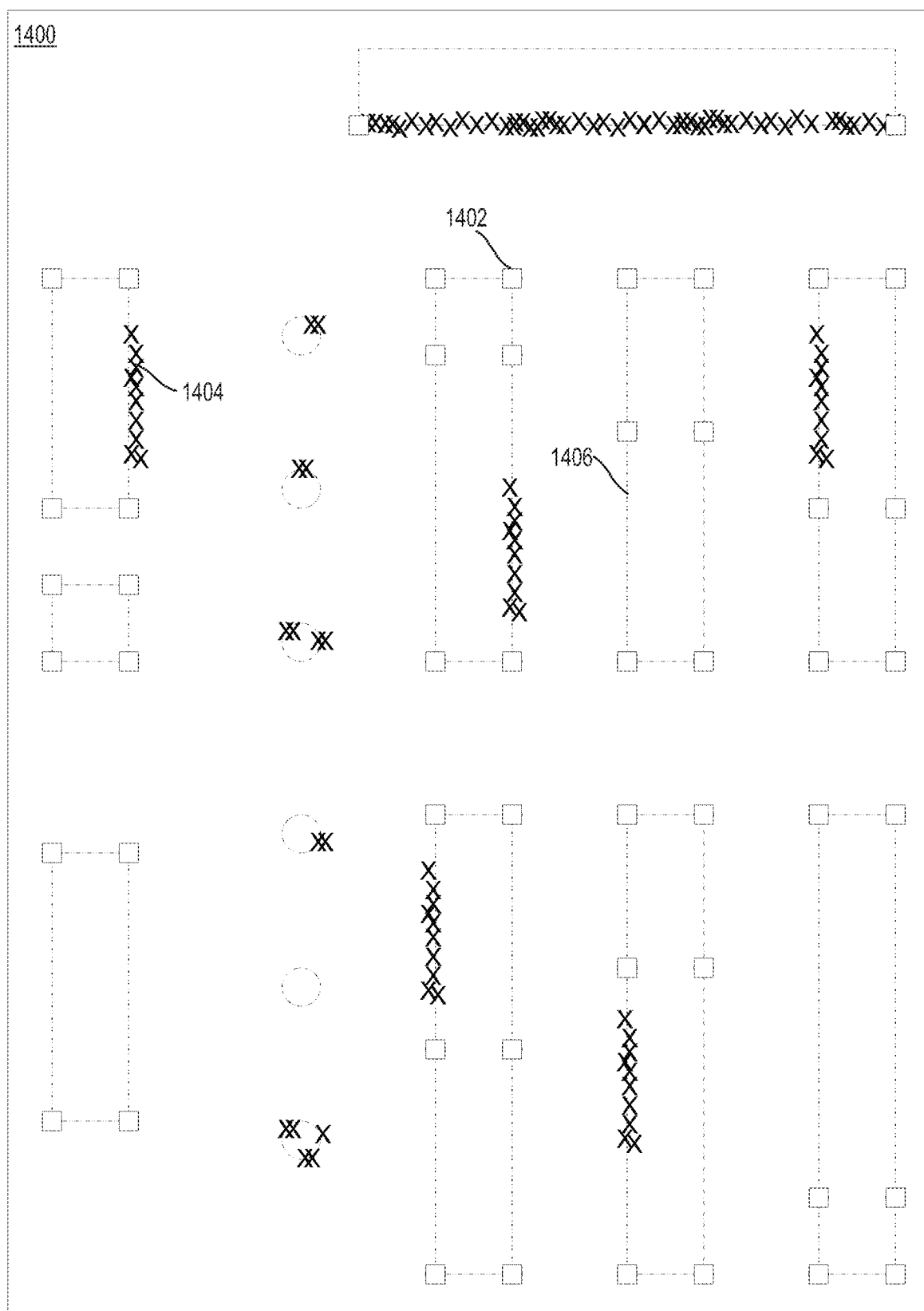
FIG. 14 illustrates a generated map of an environment of a robotic vehicle that includes false detection source regions, in accordance with an example embodiment.

FIG. 14 illustrates a generated map of an environment of a robotic vehicle that includes false detection source regions, in accordance with an example embodiment. As described above with regard to FIGS. 12D and 3, one or more robotic vehicles may navigate through an environment of the robotic vehicles and obtain sensor data. From the sensor data, a plurality of landmarks and false detections may be detected. The map 1400 may include indications of the landmarks 1402, and may include indications of sources of the false detections 1404. This map 1400 may be used for determining a pose of robotic vehicles as described above with regard to FIGS. 10A-D and 11A-D. Further, the map may be used to determine a pose estimation confidence for each pose estimate. In the present example, each of the mapped false detection sources may correspond to a separate false detection source region. For example, each false detection source may be associated with a radius surrounding the false detection source, and the area within the radius may be considered an individual false detection source region. In other examples, each false detection source may be associated with a surface 1006. In these examples, each mapped surface 1006 being within a threshold distance of a defined number of false detection sources may be considered a false detection source region. False detection source regions may be determined in other ways as well.

Figure 15:
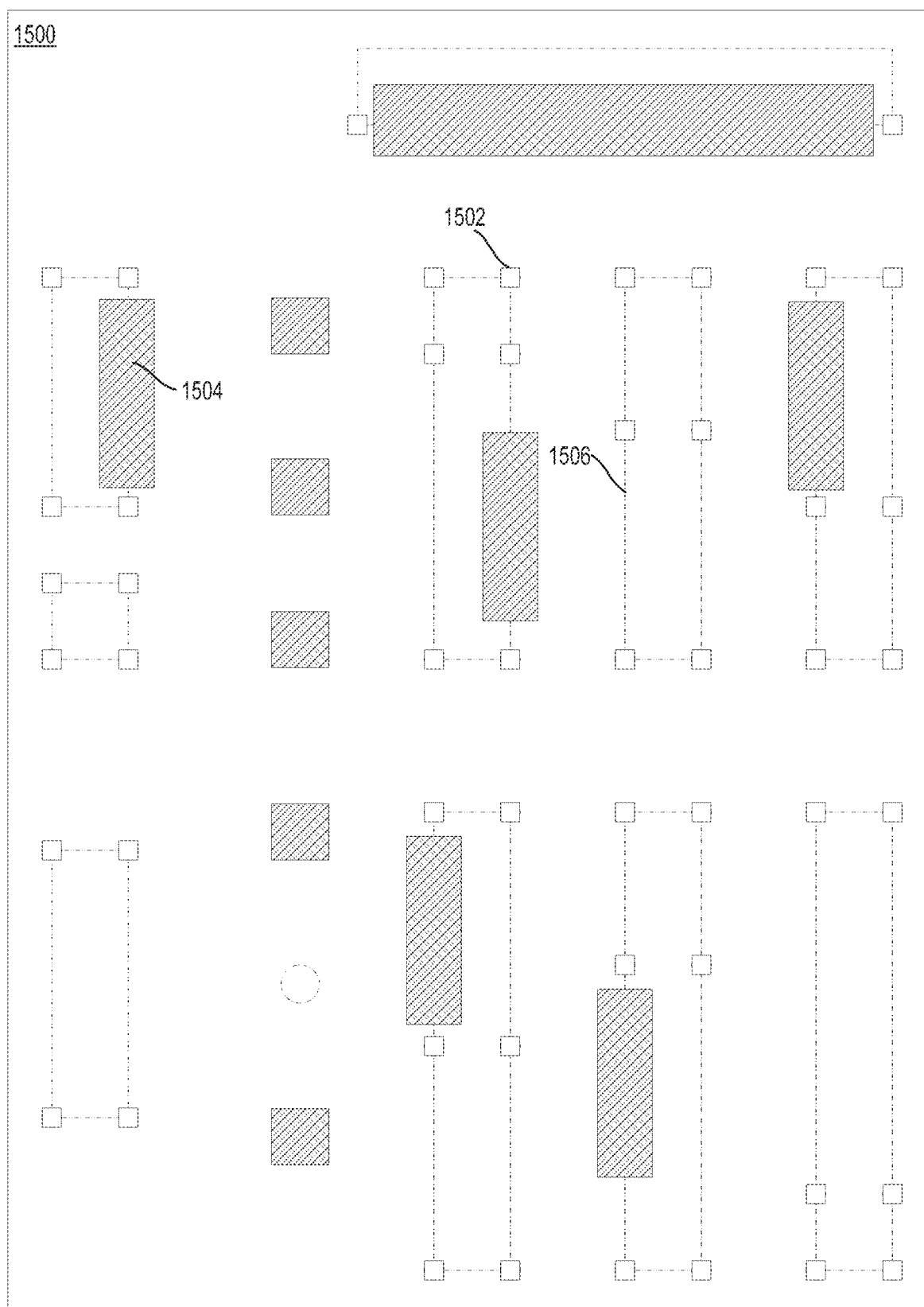
FIG. 15 illustrates another generated map of an environment of a robotic vehicle that includes false detection source regions, in accordance with another example embodiment.

FIG. 15 illustrates another generated map of an environment of a robotic vehicle that includes false detection source regions, in accordance with another example embodiment. As described with regard to FIG. 11, a generated map of an environment of a robotic vehicle may include indications of false detection source regions. The generated map 1500 includes indications of mapped landmarks 1502, false detection source regions 1504, and environment features 1506. In the present example, false detection source regions 1504 are determined based on a number of false detections per area unit. In some examples, a number of false detection sources may be determined for a plurality of regions of the map 1500. If the number of false detection sources within a region meets or exceeds a false detection source region threshold, the region may be considered a false detection source region. In another example, as described above, each false detection source may be associated with a radius and a corresponding area within the region. If two or more such areas overlap, they may be considered to form a single false detection source region 1504.

It should be understood that, though the false detection source regions 1504 may be disjointed (i.e. defined by a plurality of areas within the environment), they may be considered to be a single false detection source region. In particular, in scenarios where the map 1500 is stored within a computer readable medium, such as a non-transitory computer readable medium, the map may be associated with a single object that includes multiple areas of the environment corresponding to the false detection source region. Alternatively, each such region may be associated with a different object stored in the computer readable medium. Other ways of defining the false detection source regions are possible as well.

Figure 16:
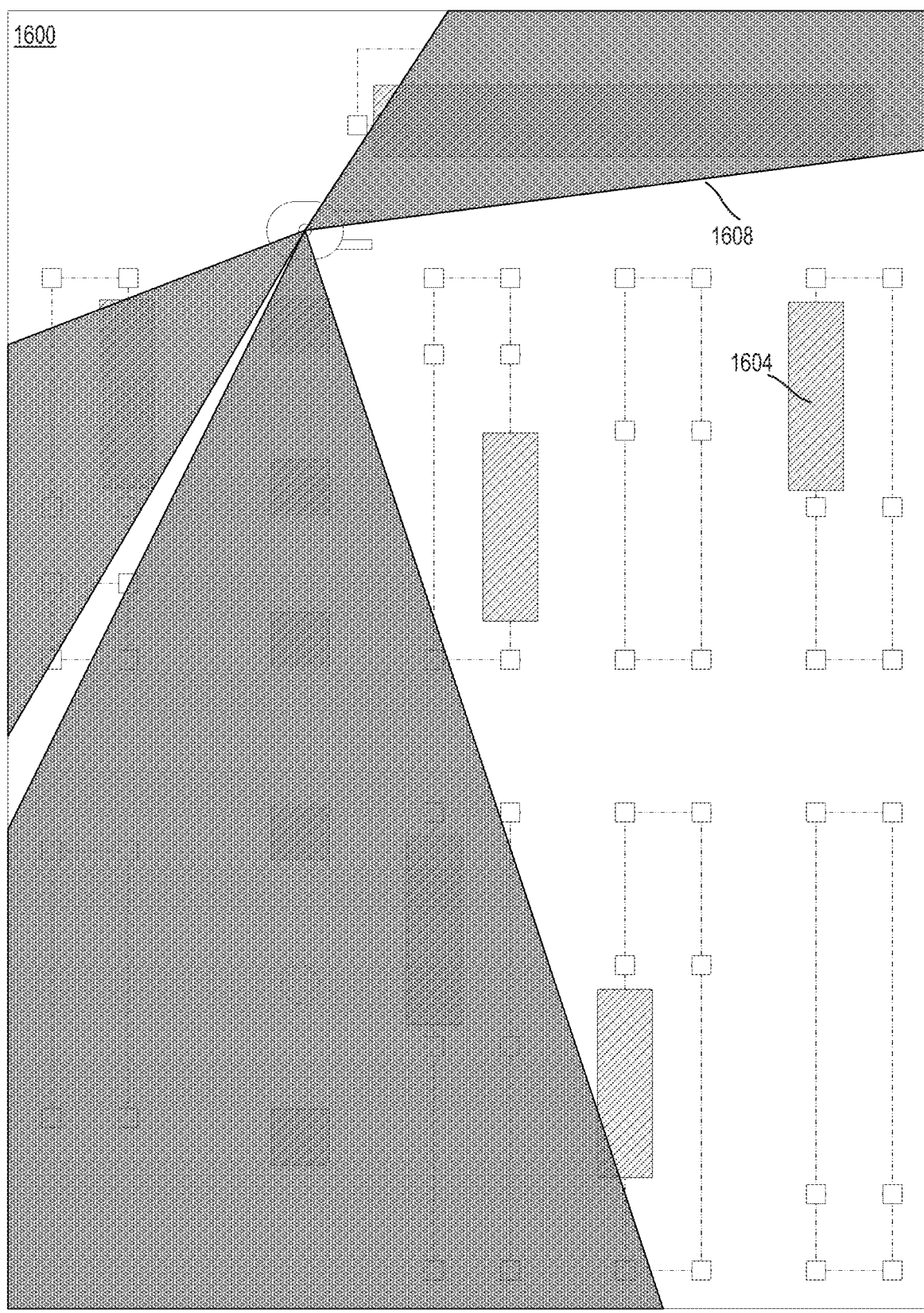
FIG. 16 illustrates a generated map of the environment of a robotic vehicle that includes false detection source regions where the robot only uses certain of the data available on the map, in accordance with another example embodiment.

FIG. 16 illustrates a generated map of the environment of a robotic vehicle that includes false detection source regions where the robot only uses certain of the data available on the map, in accordance with another example embodiment. As described above with regard to FIG. 7, a robotic vehicle may have an initial pose estimate, and may include odometry data that allows the robotic vehicle to determine how much distance has passed since the initial pose estimate. Based on the initial pose estimate, and perhaps the odometry data, the robotic vehicle or a computing system associated with the robotic vehicle may have a general sense of a location of the robotic vehicle within the environment before it determines sensor data indicative of the environment. When a map 1600 of the environment includes false detection source regions 1604, the robotic vehicle may choose not to obtain data from the false detection source regions. As such, at any given point while the robot navigates through the environment, there may be false detection zones 1608 of the environment that include the false detection source regions 1604. In some examples, the robotic vehicle may obtain data from false detection zones 1608, but may not use them when determining a pose estimate. As explained above, false detections may hinder the process of associating detected candidate landmarks with mapped landmarks in the environment. However, in these examples, data from the false detection zones may be used to determine a confidence level associated with the pose estimate.

Figure 17B:
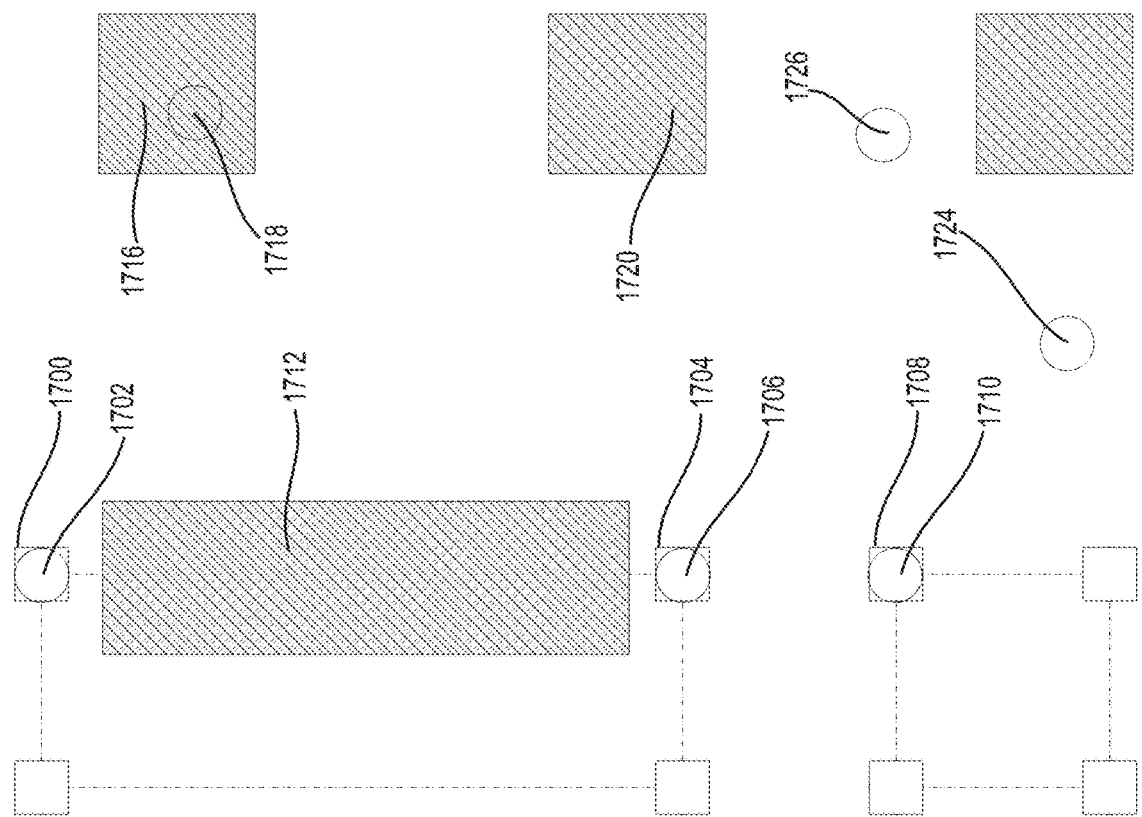
FIG. 17B illustrates a different plurality of detected landmarks and false detections in a pose confidence determination scenario, in accordance with another example embodiment.
Figure 17A:
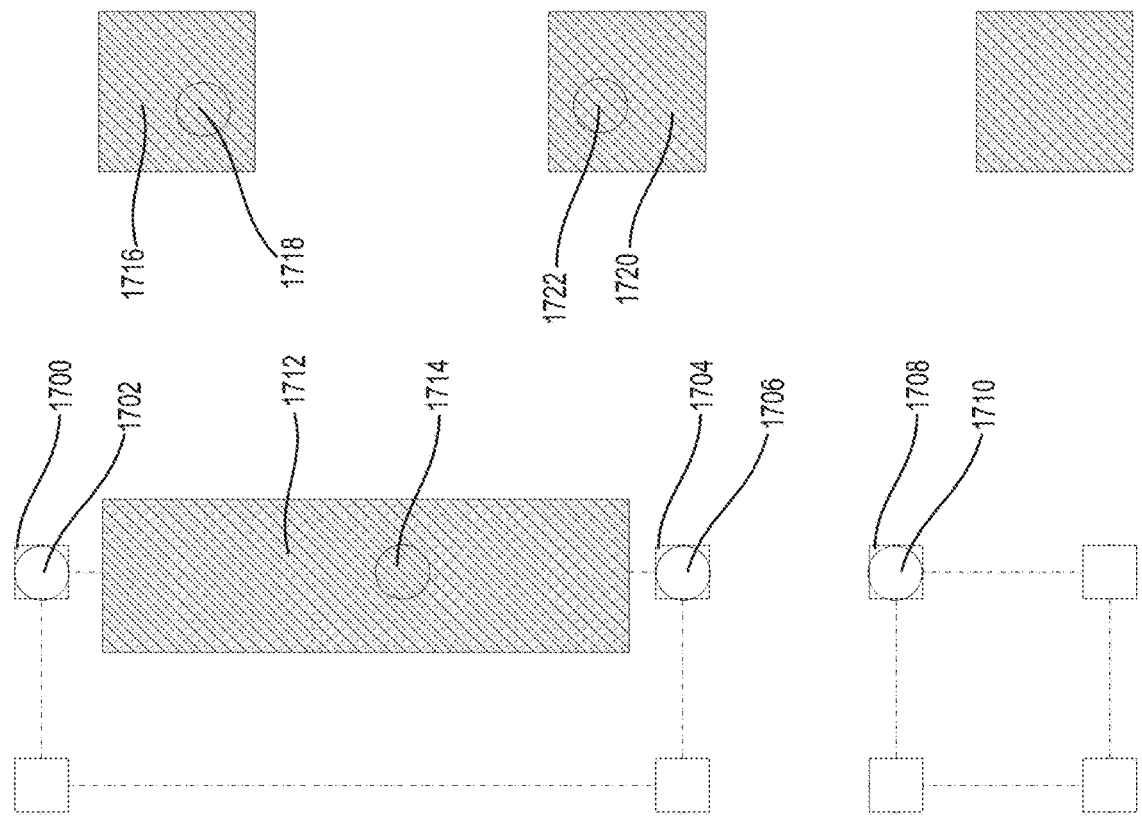
FIG. 17A illustrates a plurality of detected landmarks and false detections in a pose confidence determination scenario, in accordance with an example embodiment.

FIG. 17A illustrates a plurality of detected landmarks and false detections in a pose confidence determination scenario, in accordance with an example embodiment. As described above with regard to FIG. 10D, false detections may negatively affect estimating a pose of the robotic vehicle. However, when such false detections are mapped by, for example, including false detection source regions within a map of the environment, the false detections may be used to determine a confidence level of a pose estimate of the robotic vehicle.

In the present example, detected candidate landmarks 1702, 1706, 1710, 1714, 1718, and 1722 have been aligned with a map of the environment. In this example, candidate landmarks 1702, 1704, and 1710 may be determined to correspond to mapped landmarks 1700, 1704, and 1708 respectively. Conversely, candidate landmarks 1714, 1718, and 1722 may be determined to correspond to false detections. In the present example, each of these candidate landmarks, so aligned, may fall within a mapped false detection source region. In particular, candidate landmarks 1714, 1718, and 1722 fall within false detection source regions 1712, 1716, and 1720 respectively. Because each false detection falls within a portion of the map known to produce false detections, the robotic vehicle or computing system may be confident that the pose estimate is accurate.

Where a map of the robotic vehicle include false detection source regions, false detections may be useful in navigating the robotic vehicle within the environment. In these examples, the confidence level of the pose estimate may be further based on the false detections determined to fall within a false detection source region. For example, the confidence level may include a ratio of candidate landmarks determined to either correspond to a mapped landmark or fall within a false detection source region to the total number of detected candidate landmarks. In this example, a ratio close to one would indicate a high likelihood of an accurate pose estimate. Conversely, a ratio close to zero would indicate a low likelihood of an accurate pose estimate. Other ways of determining a confidence level of a pose estimate based on false detections that fall within a false detection source region are possible as well.

In these examples, a confidence level may also be used while estimating a pose of the robotic vehicle. Each sample set may be transformed and, in addition to determining inliers and outliers, it may be determined whether any of the transformed candidate landmarks fall within a mapped false detection source region. If for example, each of the transformed candidate landmarks corresponds to an inlier or falls within a false detection source region, then the sample set may be selected to determine the pose estimate. Other ways of using a confidence level associated with transformed candidate landmarks to determine a pose estimate are possible as well.

FIG. 17B illustrates a plurality of detected landmarks and false detections in a pose confidence determination scenario, in accordance with another example embodiment. In contrast to the example in FIG. 17A, aligned candidate landmarks 1702, 1706, 1710, 1718, 1724, and 1726 do not all correspond to a mapped landmark or fall within a false detection source region. In this example, candidate landmarks 1724 and 1726 come from an unmapped false detection source, and, as such, detract from both determining the pose estimate and the confidence associated with the pose estimate. Accordingly, a confidence level associated with a pose estimate based on these detected candidate landmarks may be lower than the confidence level calculated with regard to FIG. 17A.

Figure 18:
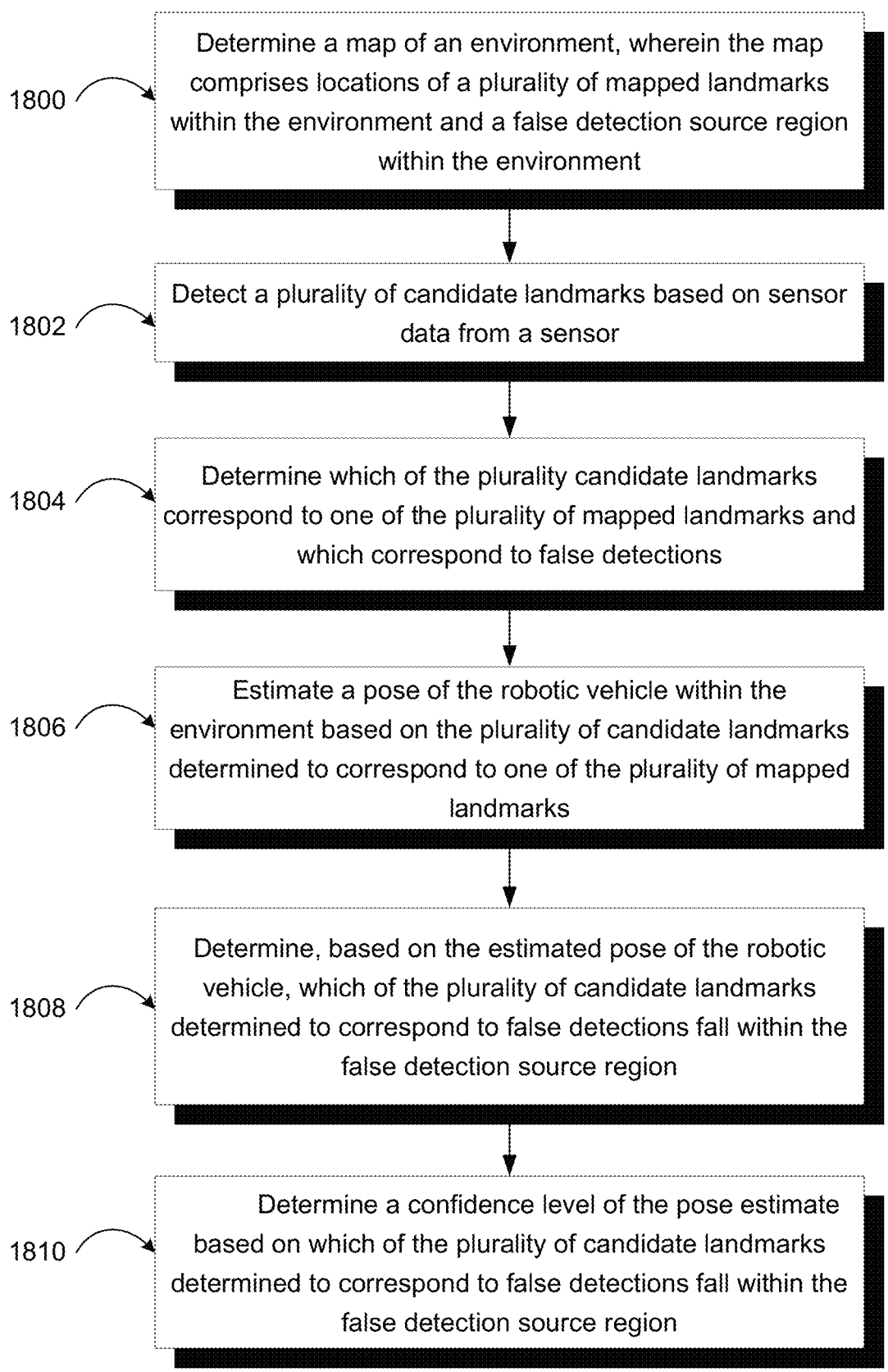
FIG. 18 is a block diagram of a method, according to an example embodiment.

FIG. 18 is a block diagram of a method, according to an example embodiment that may be used to determine a pose of a robotic vehicle within an environment, and a confidence level of the pose estimate. In some examples, the method may be carried out as part of a system. For example, block 1802 may be carried out by one or more sensors of a robot in conjunction with one or more processors executing program instructions stored on a non-transitory computer readable medium. In the example, the one or more sensors of the robot may receive signals from the plurality of candidate landmarks, while the executed program instructions may detect a plurality of candidate landmarks, and determine locations of the candidate landmarks in relation to the robot based on the received signals. The one or more processors may execute the program instructions to also perform the functions included in blocks 1800, 1804, 1806, 1808, and 1810.

In other examples, the method may be carried out as part of a computing system. In these examples, a non-transitory computer readable medium may store instructions executable by one or more processors to cause the computing system to perform the blocks of the method.

In these examples, the one or more processors and non-transitory computer readable medium may perform the blocks remotely. In other examples, the one or more processors and non-transitory computer readable medium may carry out the method at the robotic vehicle. In still other examples, portions of the method may be carried out remotely, while other portions may be carried out at the robotic vehicle.

Block 1800 of the method may be performed to determine a map of an environment of a robotic vehicle, wherein the map includes locations of a plurality of mapped landmarks within the environment and a false detection source region within the environment. The map may be determined based on sensor data obtained by one or more sensors on one or more robotic vehicles within the environment. The sensor data may be processed to detect false detections, and the map may be updated to include false detection source regions that represent sources of the false detections.

Block 1802 of the method may be performed to detect a plurality of candidate landmarks based on sensor data from a sensor on the robotic vehicle. For example the sensor on the robotic vehicle may receive signals from a plurality of signal sources within the environment, and determining which of the received signals comprises a signal strength that meets or exceeds a candidate landmark signal strength threshold.

Block 1804 of the method may be performed to determine which of the candidate landmarks correspond to one of the plurality of mapped landmarks and which correspond to false detections. For example, a transformation may be applied to the candidate landmarks to align a sample set of the candidate landmarks with corresponding mapped landmarks. Based on how closely the transformed candidate landmarks align with mapped landmarks, it may be determined which candidate landmarks correspond to mapped landmarks and which correspond to false detections.

Block 1806 of the method may be performed to estimate a pose of the robotic vehicle within the environment based on the detected candidate landmarks determined to correspond to one of the plurality of mapped landmarks.

Block 1808 of the method may be performed to determine, based on the estimated pose of the robotic vehicle, which of the detected candidate landmarks determined to correspond to false detections fall within the false detection source region. For example, all of the candidate landmarks may be transformed to align on the map based on the sample set used to estimate the pose of the robot. So aligned, the false detections may either fall within or outside of the false detection source region.

Block 1810 of the method may be performed to determine a confidence level of the pose estimate based on which of the detected candidate landmarks determined to correspond to false detections fall within the false detection source region. For example, a total number of candidate landmarks may be determined, and determining the confidence level of the pose estimate may be based on a proportion of the total number of candidate landmarks that correspond to mapped landmarks or that fall within the false detection source region.

IV. OTHER LOCALIZATION EMBODIMENTS

Though the detailed description of FIGS. 6-18 generally relates to localizing robotic vehicles within an environment, it should be understood that such description is provided for purposes of example, and should not be construed as limiting. For instance, the same systems and methods described above may be implemented to localize a manually-operated vehicle in the environment. Such localization may allow a human operator to view a map of the environment provided for display on the manually-operated vehicle that includes an indication of a current pose estimate of the manually-operated vehicle.

Further, the systems and methods described above may be implemented to localize other devices, such as a mapping sensor unit. A mapping sensor unit may be moved to multiple positions within an environment to generate data used for mapping the environment. At each position, the sensor unit may be localized using the systems and methods described above. Such data may be used in generating a map of the environment.

It should be readily understood by those having skill in the art that the systems and methods described can be implemented to localize any number of vehicles, devices, or sensors disposed within an environment.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining a map of an environment, wherein the map comprises locations of a plurality of mapped landmarks within the environment and a false detection source region within the environment, wherein the false detection source region indicates a portion of the environment from which false detections are expected;
   detecting a plurality of candidate landmarks based on sensor data from a sensor;
   determining which of the plurality of candidate landmarks correspond to one of the plurality of mapped landmarks and which correspond to false detections;
   estimating a pose of a robotic vehicle within the environment based on the plurality of candidate landmarks determined to correspond to one of the plurality of mapped landmarks;
   determining, based on the estimated pose of the robotic vehicle, which of the plurality of candidate landmarks determined to correspond to false detections fall within the false detection source region; and
   determining a confidence level of the pose estimate of the robotic vehicle based on which of the plurality of candidate landmarks determined to correspond to false detections fall within the false detection source region, wherein determining that a given candidate landmark that corresponds to a false detection does not fall within the false detection source region lowers the confidence level.

2. The method of claim 1, further comprising navigating the robotic vehicle through the environment based on the estimated pose of the robotic vehicle and the confidence level of the pose estimate.

3. The method of claim 1, wherein determining the mapped false detection source region comprises:
   determining a plurality of false detections;
   determining a false detection source location associated with each false detection; and
   determining the mapped false detection source region based on the determined false detection source locations.

4. The method of claim 3, wherein determining the mapped false detection source region based on the determined false detection source locations comprises determining a region comprising a number of false detections per area unit that meets or exceeds a false detection source region threshold.

5. The method of claim 3, wherein determining the mapped false detection source region based on the false detection source locations comprises defining an area surrounding each false detection source location as being part of the false detection source region.

6. The method of claim 1, wherein detecting the plurality of candidate landmarks comprises receiving, by the sensor, signals from a plurality of signal sources within the environment, and determining which of the received signals comprises a signal strength that meets or exceeds a candidate landmark signal strength threshold.

7. The method of claim 1, wherein determining which of the candidate landmarks correspond to mapped landmarks comprises applying a transformation to the plurality of candidate landmarks that aligns the candidate landmarks with the mapped landmarks and determining which of the transformed candidate landmarks fall within an inlier distance threshold of one of the mapped landmarks, wherein the inlier distance threshold corresponds to a radius surrounding a mapped landmark.

8. The method of claim 7, wherein determining which of the candidate landmarks correspond to false detections comprises determining a remainder of candidate landmarks that do not correspond to one of the plurality of mapped landmarks.

9. The method of claim 1, wherein the sensor data from the sensor comprises source locations of the candidate landmarks relative to the robotic vehicle, and wherein estimating the pose of the robotic vehicle comprises:
   applying a transformation to each of the candidate landmarks determined to correspond to mapped landmarks that aligns each such candidate landmark with a corresponding mapped landmark; and
   determining a pose of the robotic vehicle relative to the aligned candidate landmarks based on the source locations of the candidate landmarks relative to the robotic vehicle.

10. The method of claim 9, wherein determining which of the detected candidate landmarks determined to correspond to false detections fall within the false detection source region comprises applying the transformation to each such candidate landmark and determining which of the transformed candidate landmarks fall within the false detection source region.

11. The method of claim 1, wherein determining the confidence level of the pose estimate based on which of the detected candidate landmarks determined to correspond to false detections fall within the false detection source region comprises:
   determining a total number of candidate landmarks; and
   determining the confidence level of the pose estimate based on a ratio of candidate landmarks that (i) correspond to a mapped landmark or that (ii) fall within a false detection source region to the total number of candidate landmarks.

12. A system, comprising:
   a robotic vehicle
   a sensor mounted on the robotic vehicle;
   one or more processors;
   a non-transitory computer-readable medium; and
   program instructions stored on the non-transitory computer readable medium and executable by the one or more processors to:

determine a map of an environment, wherein the map comprises locations of a plurality of mapped landmarks within the environment and a false detection source region within the environment, wherein the false detection source region indicates a portion of the environment from which false detections are expected;

detect a plurality of candidate landmarks based on sensor data from the sensor;

determine which of the detected candidate landmarks correspond to one of the plurality of mapped landmarks and which correspond to false detections;

estimate a pose of the robotic vehicle within the environment based on the plurality of candidate landmarks determined to correspond to one of the plurality of mapped landmarks;

determine, based on the estimated pose of the robotic vehicle, which of the plurality of candidate landmarks determined to correspond to false detections fall within the false detection source region; and determine a confidence level of the pose estimate of the robotic vehicle based on which of the plurality of candidate landmarks determined to correspond to false detections fall within the false detection source region, wherein determining that a given candidate landmark that corresponds to a false detection does not fall within the false detection source region lowers the confidence level.

13. The system of claim 12, wherein the sensor comprises a light detection and ranging (LIDAR) unit configured to send a signal to a portion of the environment, and wherein the sensor is configured to detect reflected signals from sources within the portion of the environment.

14. The system of claim 12, wherein the landmarks placed within the environment comprise retroreflective markers.

15. The system of claim 12, wherein the one or more processors are comprised within the robotic vehicle.

16. The system of claim 12, further comprising a remote controller of the robotic vehicle, wherein a processor of the one or more processors is comprised within the robotic vehicle and a processor of the one or more processors is comprised within the remote controller of the robotic vehicle.

17. A non-transitory computer readable medium having stored thereon instructions executable by one or more processors to cause a computing system to perform functions comprising:

determining a map of an environment, wherein the map comprises locations of a plurality of mapped landmarks within the environment and a plurality of false detection source regions within the environment, wherein each false detection source region indicates a portion of the environment from which false detections are expected;

detecting a plurality of candidate landmarks based on sensor data from a sensor mounted on a robotic vehicle;

determining which of the plurality of candidate landmarks correspond to one of the plurality of mapped landmarks and which correspond to false detections;

estimating a pose of the robotic vehicle within the environment based on the plurality of candidate landmarks determined to correspond to one of the plurality of mapped landmarks;

determining, based on the estimated pose of the robotic vehicle, which of the plurality of candidate landmarks determined to correspond to false detections fall within one of the false detection source regions; and determining a confidence level of the pose estimate of the robotic vehicle based on which of the plurality of candidate landmarks determined to correspond to false detections fall within the false detection source region, wherein determining that a given candidate landmark that corresponds to a false detection does not fall within the false detection source region lowers the confidence level.

18. The non-transitory computer readable medium of claim 17, wherein the functions further comprise navigating the robotic vehicle through the environment based on the estimated pose of the robotic vehicle and the confidence level of the pose estimate.

19. The non-transitory computer readable medium of claim 17, further having stored therein the determined map of the environment.

* * * * *